US007863363B2

(12) United States Patent
Sugimoto

(10) Patent No.: US 7,863,363 B2
(45) Date of Patent: Jan. 4, 2011

(54) CLEANING BLADE FOR USE IN IMAGE-FORMING APPARATUS

(75) Inventor: Mutsuki Sugimoto, Hyogo (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 484 days.

(21) Appl. No.: 11/984,506

(22) Filed: Nov. 19, 2007

(65) Prior Publication Data

US 2008/0118288 A1 May 22, 2008

(30) Foreign Application Priority Data

Nov. 20, 2006 (JP) ............................ 2006-312678
Mar. 26, 2007 (JP) ............................ 2007-078263

(51) Int. Cl.
*C08K 5/36* (2006.01)

(52) U.S. Cl. ...................................................... 524/392

(58) Field of Classification Search .................. 524/392
See application file for complete search history.

(56) References Cited

U.S. PATENT DOCUMENTS

2003/0032501 A1 2/2003 Sakagami et al.

FOREIGN PATENT DOCUMENTS

| | | | |
|---|---|---|---|
| JP | 6-263924 | A | 9/1994 |
| JP | 6-305157 | A | 11/1994 |
| JP | 2000-75743 | A | 3/2000 |
| JP | 2001-187167 | A | 7/2001 |
| JP | 2003-33447 | A | 2/2003 |
| JP | 2003-38682 | A | 2/2003 |
| KR | 2002-0051203 | A | 6/2002 |

*Primary Examiner*—Edward J Cain
(74) *Attorney, Agent, or Firm*—Birch, Stewart, Kolasch & Birch, LLP

(57) ABSTRACT

A cleaning blade for use in an image-forming apparatus formed by molding a thermosetting elastomer composition containing a rubber component, a filler, a crosslinking agent, and a dispersion-improving agent. As the dispersion-improving agent, thiol or/and sulfide having a specific chemical structure are contained in the thermosetting elastomer composition at 0.05 to 15 parts by mass for 100 parts by mass of the rubber component; or fluorine-substituted benzenethiol or/and a metal salt thereof are contained in the thermosetting elastomer composition at 0.05 to 10 parts by mass for 100 parts by mass of the rubber component.

19 Claims, 3 Drawing Sheets

CLEANING BLADE FOR USE IN IMAGE-FORMING APPARATUS

This nonprovisional application claims priority under 35 U.S.C. §119(a) on Patent Application No(s). 2006-312678 filed in Japan on Nov. 20, 2006 and 2007-078263 filed in Japan on Mar. 26, 2007, the entire contents of which are hereby incorporated by reference.

FIELD OF THE INVENTION

The present invention relates to a cleaning blade for use in an image-forming apparatus and more particularly to a cleaning blade, for use in an image-forming apparatus, which is formed by molding a thermosetting elastomer composition, excellent in its repulsion elasticity, which contains a rubber component (1), a filler (2), a crosslinking agent (3), and a dispersion-improving agent (4). The cleaning blade has an excellent wear resistance and cleaning performance.

In an electrostatic photocopying machine in which ordinary paper is used as recording paper, a copying operation is performed as follows: an electrostatic charge is applied to the surface of a photoreceptor by discharge, an image is exposed onto the photoreceptor to form an electrostatic latent image thereon, toner having an opposite polarity is attached to the electrostatic latent image to develop the electrostatic latent image, a toner image is transferred to recording paper, and the recording paper to which the toner image has been transferred is heated under pressure to fix the toner to the recording paper. Therefore to sequentially copy the image of an original document on a plurality of sheets of recording paper, it is necessary to remove the toner which remains on the surface of the photoreceptor after the toner image is transferred to the recording paper from the photoreceptor in the above-described processes. As a method of removing the toner which remains on the surface of the photoreceptor drum, a blade cleaning method of sliding a cleaning blade in contact with the surface of the photoreceptor drum, with the cleaning blade being pressed against the surface of the photoreceptor drum is known.

The cleaning blade composed of polyurethane rubber is used in many image-forming apparatuses used in the above-described method.

For example, disclosed in Japanese Patent Application Laid-Open No. 2000-75743 (patent document 1) is a cleaning blade for use in an electrophotographic apparatus having a blade member composed of polyurethane having a JIS A hardness of 62 to 80 at 23° C. and a repulsion elasticity of 5 to 15%.

The cleaning blade composed of the urethane rubber has a low heat resistance. Thus its edge wears and rounds because of friction between it and the photoreceptor. Consequently the cleaning blade is incapable of removing the toner with the edge. The blade member disclosed in the patent document 1 has a low modulus of repulsion elasticity of 5 to 15% and is always in close contact with the surface of the photoreceptor so that the blade member displays its cleaning performance. Consequently the edge of the cleaning blade is worn to a high extent.

To restrain a decrease of the depth of wear, it is necessary to decrease the contact pressure (hereinafter referred to as line pressure) of the edge against the photoreceptor. As a result, the cleaning blade removes toner defectively. The conventional cleaning blade composed of the urethane rubber is capable of cleaning pulverized toner or deformed polymerized toner, even though the line pressure is low. The present tendency is to save energy, reduce the cost of the image-forming apparatus, and form a high-quality image. That being the case, toner having a small diameter and spherical polymerized toner have been developed. As a result, unless the line pressure is increased, it is difficult to remove toner that remains on the surface of the photoreceptor. Thereby the toner is apt to be removed defectively.

Patent Document 1: Japanese Patent Application Laid-Open No. 2000-75743

Patent Document 2: Japanese Patent Application Laid-Open No. 2001-187167

Patent Document 3: Japanese Patent Application Laid-Open No. 2003-33447

Patent Document 4: Japanese Patent Application Laid-Open No. 2003-38682

SUMMARY OF THE INVENTION

The present invention has been made in view of the above-described problems. Therefore it is an object of the present invention to provide a cleaning blade which is excellent in the wear resistance of an edge, can be brought into contact with a member such as a photoreceptor to be cleaned at a high contact pressure, and is capable of displaying a superior performance of removing even toner having a small diameter and spherical polymerized toner difficult to be removed.

To solve the above-described problems, the first invention provides a cleaning blade for use in an image-forming apparatus formed by molding a thermosetting elastomer composition containing a rubber component (1), a filler (2), a crosslinking agent (3), and a dispersion-improving agent (4), wherein as the dispersion-improving agent (4), a compound shown by a formula (1) shown below or/and a compound shown by a formula (2) shown below are contained in the thermosetting elastomer composition at 0.05 to 15 parts by mass for 100 parts by mass of said rubber component (1):

Chemical Formula 1

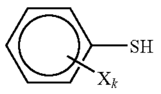

(1)

(where X indicates substituting groups except fluoro group, and k denotes integers 0 through 5)

Chemical Formula 2

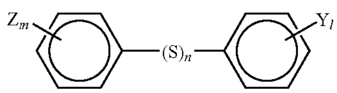

(2)

(where Y and Z denote substituting groups; l and m denote integers 0 through 5; and n denotes natural numbers).

The second invention provides a cleaning blade for use in an image-forming apparatus formed by molding a thermosetting elastomer composition containing a rubber component (1), a filler (2), a crosslinking agent (3), and a dispersion-improving agent (4), wherein as the dispersion-improving agent (4), a compound shown by a formula (3) shown below or/and a metal salt of the compound is contained in the thermosetting elastomer composition at 0.05 to 10 parts by mass for 100 parts by mass of said rubber component (1):

Chemical Formula 3

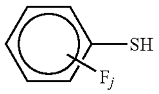

(3)

(where F denotes fluoro group; and j denotes integers 1 through 5).

The present inventor has energetically examined the wear resistance of the edge of the cleaning blade and found that the wear resistance of the edge can be improved by composing the cleaning blade of a thermosetting elastomer composition having a high modulus of repulsion elasticity in the range of preferably 50 to 70%.

It is pointed out in the patent document 1 that in the blade member made of polyurethane having the modulus of repulsion elasticity of 20 to 60%, toner fuses filmily to the surface of the photoreceptor like fused toner and that when the toner particles form a giant mass, the blade member has a deteriorated cleaning performance. But if the wear resistance of the edge of the cleaning blade can be improved by composing the cleaning blade of a thermosetting elastomer composition having a high modulus of repulsion elasticity, it is possible to bring the cleaning blade into contact with the photoreceptor at a high pressure. Thereby even the fused toner can be removed sufficiently.

Based on the finding, the present inventors have made energetic examinations to improve the modulus of repulsion elasticity of the thermosetting elastomer composition composing the cleaning blade and succeeded in improving the dispersibility of the filler (2) and improving the modulus of repulsion elasticity of the thermosetting elastomer composition by adding thiol or/and sulfide having a specific chemical structure to the rubber component (1) as the dispersion-improving agent (4).

Described in Japanese Patent Application Laid-Open No. 2001-187167 (patent document 2), Japanese Patent Application Laid-Open No. 2003-33447 (patent document 3), and Japanese. Patent Application Laid-Open No. 2003-38682 (patent document 4) are rubber compositions containing the thiol shown by the chemical formula (1), the sulfide shown by the chemical formula (2), and the fluorine-substituted benzenethiol (fluorine-substituted thiophenol) shown by the chemical formula (3). But the inventions described in the three known documents relate to the core of a golf ball, and neither description nor suggestion relating to the cleaning blade of an image-forming apparatus is made in the three known documents. Needless to say, there is no description nor suggestion relating to the relationship between the modulus of repulsion elasticity of the cleaning blade for use in the image-forming apparatus and the wear resistance thereof as well as the line pressure and the relationship between the modulus of repulsion elasticity of the cleaning blade and the cleaning performance thereof.

Each of the components of the thermosetting elastomer composition composing the cleaning blade of the present invention for use in the image-forming apparatus is described in detail below.

In the thiol shown by the chemical formula (1) or the sulfide shown by the chemical formula (2), the hydrogen of phenyl radical may be substituted with substituting groups shown with X, Y, and Z. The number of substituting groups X, the number of substituting groups Y, and the number of substituting groups Z in the chemical formulas (1) and (2) are expressed by k, l, and m respectively which take chemically permissible integers 1 through 5 according to the kind of the substituting groups X, Y, and Z. When the phenyl radical is not modified with the substituting groups X, Y, and Z, k, l, and m are zero respectively. When k is an integer not less than two, a plurality of substituting groups X is present. In this case, the substituting groups X may be identical to or different from each other. Same is true of the substituting groups Y and Z.

The substituting groups X, Y, and Z may consist of various substituting groups, provided that they are chemically permissible. More specifically, it is possible to list (i) halogen atoms (for example, fluorine, chlorine, bromine, and iodine are listed but the substituting group X does not consist of fluorine), (ii) nitro group, (iii) cyano group, (iv) carboxyl group, (v) $C_{1-6}$alkoxy-carbonyl group (for example, methoxycarbonyl, ethoxycarbonyl, tert-butoxycarbonyl, and the like), (vi) hydroxy group, (vii) $C_{1-3}$alkylenedioxy group (for example, methylenedioxy, ethylenedioxy, and the like), (viii) $C_{1-6}$alkyl group which may be halogenated (for example, methyl, ethyl, propyl, isopropyl, n-butyl, isobutyl, sec-butyl, tert-butyl, trifluoromethyl, and the like), (ix) $C_{1-6}$alkoxy group which may be halogenated (for example, methoxy, ethoxy, propoxy, isopropoxy, n-butoxy, isobutoxy, sec-butoxy, tert-butoxy, and the like), (x) benziloxy group, (xi) phenyl group, (xii) benzoyl group, (xiii) phenoxy group, (xiv) amino group, (xv) mono-$C_{1-6}$alkylamino group or di-$C_{1-6}$alkylamino group (for example, methylamino, ethylamino, dimethylamino, diethylamino, methylethylamino, and the like), (xvi) $C_{1-6}$alkylaminocarbonyl group, (xvii) carbamoyl group, (xviii) $C_{1-6}$alkyl-carbonyl group (for example, methylcarbonyl, ethylcarbonyl, butyl carbonyl, and the like), and (xix) halo$C_{1-6}$alkyl carbonyl group.

As the substituting groups X, Y, and Z, (i) halogen atoms, (ii) nitro group, and (iii) cyano group are preferable. The substituting groups Y and X may consist of fluorine, but the substituting group X does not consist of fluorine.

The reference symbol n in the chemical formula (2) indicates natural numbers. The natural number n is favorably integers not less than two and more favorably two.

The thiol shown by the chemical formula (1) consists of thiophenols such as benzenethiol(thiophenol), 4-chlorobenzenethiol, 3-chlorobenzenethiol, 4-bromobenzenethiol, 3-bromobenzenethiol, 4-iodobenzenethiol, 2,5-dichlorobenzenethiol, 3,5-dichlorobenzenethiol, 2,6-dichlorobenzenethiol, 2,5-dibromobenzenethiol, 3,5-dibromobenzenethiol, 2-chloro-5-bromobenzenethiol, 2,4,6-trichlorobenzenethiol, 2,3,4,5,6-pentachlorobenzenethiol, 4-cyanobenzenethiol, 2-cyanobenzenethiol, 4-nitrobenzenethiol, and 2-nitrobenzenethiol.

The benzenethiol, the 4-chlorobenzenethiol, the 4-bromobenzenethiol, the 4-iodobenzenethiol, the 2,5-dichlorobenzenethiol, the 3,5-dichlorobenzenethiol, the 2-chloro-5-bromobenzenethiol, the 2,4,5-trichlorobenzenethiol, and the 2,3,4,5,6-pentachlorobenzenethiol are favorable.

As the sulfide shown by the chemical formula (2), it is possible to list diphenyl disulfide, bis(4-chlorophenyl)disulfide, bis(3-chlorophenyl)disulfide, bis(4-bromophenyl)disulfide, bis(3-bromophenyl)disulfide, bis(4-fluorophenyl)disulfide, bis(4-iodophenyl)disulfide, bis(2,5-dichlorophenyl) disulfide, bis(3,5-dichlorophenyl)disulfide, bis(2,6-dichlorophenyl)disulfide, bis(2,5-dibromophenyl)disulfide, bis(3,5-dibromophenyl)disulfide, bis(2-chloro-5-bromophenyl)disulfide, bis(2,4,6-trichlorophenyl)disulfide, bis(2,4,6-tribromophenyl)disulfide, bis(tetrabromophenyl)disulfide, bis(2,3,4,5,6-pentachlorophenyl)disulfide, bis(2,3,4,5,6-pentafluorophenyl)disulfide, bis(2,3,4,5,6-pentabromophenyl)disulfide, bis(4-cyanophenyl)disulfide, bis(2-cyanophenyl)disulfide, bis(4-nitrophenyl)disulfide, and bis(2-nitrophenyl)disulfide.

It is preferable to use the diphenyl disulfide, the bis(4-chlorophenyl)disulfide, the bis(4-fluorophenyl)disulfide, the bis(4-iodinephenyl)disulfide, the bis(2,5-dichlorophenyl) disulfide, the bis(3,5-dichlorophenyl)disulfide, the bis(2-chloro-5-bromophenyl)disulfide, the bis(2,4,5-trichlorophenyl)disulfide, the bis(2,3,4,5,6-pentachlorophenyl)disulfide, and the bis(2,3,4,5,6-pentafluorophenyl)disulfide.

It is favorable that the sulfide shown by the chemical formula (2) is a compound in which at least one of the substituting groups Y and Z consists of a bromo group (Br). It is especially favorable that not less than three of the substituting group Y and not less than three of the substituting group Z are Br and most favorable that the substituting groups Y and Z are all Br.

As compounds in which at least one of the substituting groups Y and Z consists of the bromo (Br) group, bis(bromophenyl)disulfide, bis(dibromophenyl)disulfide, bis(tribromophenyl)disulfide, bis(tetrabromophenyl)disulfide, and bis (pentabromophenyl)disulfide are favorable. The bis (pentabromophenyl)disulfide is more favorable.

In the fluorine-substituted benzenethiol shown by the chemical formula (3), at least one substituting group X of the benzenethiol shown by the chemical formula (1) consists of a fluoro group (F).

In the present invention, the fluorine-substituted benzenethiol is used to improve the dispersibility of a co-crosslinking agent and in addition the modulus of repulsion elasticity of the cleaning blade over that of a cleaning blade having the same hardness as that of the cleaning blade of the present invention. That is, of benzenethiol (thiophenol) compounds, the fluorine-substituted benzenethiol shown by the chemical formula (3) or/and a metal salt thereof show excellent repulsion irrespective of the vibration extent of the cleaning blade. Therefore supposing that the modulus of repulsion elasticity of the cleaning blade of the present invention is equal to that of the conventional cleaning blade, the cleaning blade of the present invention can be formed softer than the conventional cleaning blade. Thereby the cleaning blade of the present invention has a wear resistance improved over that of the conventional cleaning blade and provides a larger nip width and better cleaning performance than the conventional cleaning blade.

The cleaning blade composed of the thermosetting elastomer composition using the fluorine-substituted benzenethiol or/and the metal salt thereof shown by the chemical formula (3) is different in the property thereof from the thermosetting elastomer composition using the benzenethiol, having the substituting group other than the fluoro group, which is shown by the chemical formula (1) and from the thermosetting elastomer composition using the sulfide shown by the chemical formula (2). Thus the thermosetting elastomer composition using the fluorine-substituted benzenethiol shown by the chemical formula (3) or/and the metal salt thereof is specified differently from that of the chemical formula (1). But it is possible to use the fluorine-substituted benzenethiol shown by the chemical formula (3) in combination with the thiol shown by the chemical formula (1) or/and the sulfide shown by the chemical formula (2). When the above-described dispersion-improving agents (4) are used in combination, the whole mixing amount thereof is set to 0.05 to 15 parts by mass and favorably 0.05 to 10 parts by mass for 100 parts by mass of the rubber component (1).

As the fluorine-substituted benzenethiols shown by the chemical formula (3), fluorobenzenethiol(fluorothiophenol), difluorobenzenethiol(difluorothiophenol), trifluorobenzenethiol(trifluorothiophenol), tetrafluorobenzenethiol(tetrafluorothiophenol), and pentafluorobenzenethiol(pentafluorothiophenol) are listed.

Of these fluorine-substituted benzenethiols, the trifluorobenzenethiol, the tetrafluorobenzenethiol and the pentafluorobenzenethiol having not less than three fluoro groups can be favorably used. The pentafluorobenzenethiol having not less than five fluoro groups can be most favorably used.

As the substituting group, other than the fluoro group, of the fluorine-substituted benzenethiol shown by the chemical formula (3), hydrogen is preferable.

As the metal salt of the fluorine-substituted benzenethiol shown by the chemical formula (3), it is possible to list metal salts of monovalent metals such as sodium, lithium, and the like and metal salts of bivalent metals such as zinc, magnesium, and the like. The magnesium salt of the fluorine-substituted benzenethiol can be favorably used.

More specifically, as the metal salt of the fluorine-substituted benzenethiol, it is possible to list a zinc salt of fluorobenzenethiol, a zinc salt of difluorobenzenethiol, a zinc salt of trifluorobenzenethiol, a zinc salt of tetrafluorobenzenethiol, a zinc salt of pentafluorobenzenethiol, a sodium salt of pentafluorobenzenethiol, a magnesium salt of fluorobenzenethiol, a magnesium salt of difluorobenzenethiol, a magnesium salt of trifluorobenzenethiol, a magnesium salt of trifluorobenzenethiol, a magnesium salt of tetrafluorobenzenethiol, and a magnesium salt of pentafluorobenzenethiol are listed.

When the thiol shown by the chemical formula (1) or/and the sulfide shown by the chemical formula (2) are used, the mixing amount of the thiol or/and the sulfide is 0.05 to 15 parts by mass for 100 parts by mass of the rubber component. If the mixing amount of the the thiol or/and the sulfide is less than 0.05 parts by mass, the dispersibility of other components and particularly the dispersibility of the filler (2) deteriorates. On the other hand, if the mixing amount of the the thiol or/and the sulfide is more than 15 parts by mass, the dispersibility of other components and particularly the dispersibility of the filler (2) also deteriorates. When the mixing amount of the thiol or/and the sulfide is less than 0.05 parts by mass or more than 15 parts by mass, the dispersibility of the filler (2) deteriorates and the thermosetting elastomer composition has a low modulus of repulsion elasticity.

The fluorine-substituted benzenethiol shown by the chemical formula (3) or/and the metal salt thereof are used as the dispersion-improving agent (4), the mixing amount of the fluorine-substituted benzenethiol is set to favorably 0.05 to 10 parts by mass and more favorably 0.05 to 5 parts by mass for 100 parts by mass of the rubber component. If the mixing amount of the fluorine-substituted benzenethiol is more than 10 parts by mass, unreacted fluorine-substituted benzenethiol is present. Thereby the thermosetting elastomer composition has low properties and is incapable of achieving a desired repulsion. On the other hand, if the mixing amount of the fluorine-substituted benzenethiol is less than 0.05 parts by mass, the dispersibility of the other components and particularly that of the filler (2) deteriorates.

When the fluorine-substituted benzenethiol shown by the chemical formula (3) or/and the metal salt thereof are used as the dispersion-improving agent (4), the upper limit of the mixing amount of the fluorine-substituted benzenethiol shown by the chemical formula (3) or/and the metal salt thereof is set lower than that of the thiol shown by the chemical formula (1) or/and the sulfide shown by the chemical formula (2). This is because by using a smaller mixing amount of the former than the latter, the thermosetting elastomer composition having a high modulus of repulsion elasticity can be formed, and in addition, the former has a higher reactivity than the latter. Thus there is a fear that when a part of the fluorine-substituted benzenethiol or/and the metal salt thereof remains unreacted, the resulting thermosetting elastomer composition has low properties.

As the rubber component (1), known rubber can be used so long as the use thereof is not contradictory to the object of the present invention. More specifically, it is possible to use acrylonitrile butadiene rubber, acrylonitrile-butadiene rubber into which carboxyl group is introduced, hydrogenated acrylonitrile-butadiene rubber, hydrogenated acrylonitrile-butadiene rubber into which carboxyl group is introduced, natural rubber, butadiene rubber, styrene-butadiene rubber, isoprene rubber, butyl rubber, chloroprene rubber, acrylic rubber, epichlorohydrin rubber, and ethylene-propylene rubber, and ethylene-propylene-diene copolymer rubber.

As the rubber component (1), one kind of rubber or more kinds of rubbers may be used by mixing them with each other.

In using two kinds of rubbers by mixing them with each other, supposing that the total mass of the rubber component is 100 parts by mass, the mixing amount of one ("rubber A") of the two kinds of the rubbers is set to 90 to 50 parts by mass and favorably 90 to 70 parts by mass, whereas the mixing amount of the other ("rubber B") of the two kinds of the rubbers is set to 10 to 50 parts by mass and favorably 10 to 30 parts by mass.

The mixing amount of the rubber A is set to not less than 50 nor more than 90 parts by mass for the following reason: If the mixing amount of the rubber A is less than 50 parts by mass, the rubber component has a low physical strength. On the other hand, if the mixing amount of the rubber A is more than 90 parts by mass, there is a fear that the performance of the rubber B is not displayed.

The mixing amount of the rubber B is set to not less than 10 nor more than 50 parts by mass for the following reason: If the mixing amount of the rubber B is less than 10 parts by mass, there is a fear that the performance of the rubber B is not displayed. On the other hand, if the mixing amount of the rubber B is more than 50 parts by mass, the rubber component has a low physical strength, based on the rubber A.

It is preferable that the rubber component (1) contains copolymer rubber containing nitrile groups.

The copolymer rubber containing the nitrile groups is obtained by copolymerizing α,β-ethylene unsaturated nitrile monomer with other monomers. As the α,β-ethylene unsaturated nitrile monomer, acrylonitrile, methacrylonitrile, α-chloroacrylonitrile, and the like are listed. The acrylonitrile is favorable. The content of the α,β-ethylene unsaturated nitrile monomeric unit is set to 10 to 60 mass %, favorably 12 to 55 mass %, and more favorably 15 to 50 mass %.

As monomers to be copolymerized with the α,β-ethylene unsaturated nitrile monomer, a conjugated diene monomer, an unconjugated diene monomer, and an α-olefin are listed. Of these monomers, the conjugated diene monomer is preferable. It is possible to use these monomers in combination with an aromatic vinyl monomer, a fluorine-containing vinyl monomer, α,β-ethylene unsaturated monocarboxylic acid, α,β-ethylene unsaturated multivalent carboxylic acid, and anhydrides thereof.

As the conjugate monomers, 1,3-butadiene, isoprene, 2,3-dimethyl-1,3-butadiene, and 1,3-pentadiene are listed. The 1,3-butadiene is preferable.

The copolymer rubber containing the nitrile groups includes hydrogenated rubber obtained by hydrogenating carbon-carbon unsaturated bonds of the copolymer rubber containing the nitrile groups by using a known method. It is especially preferable to use the hydrogenated rubber having residual double bonds of not more than 10%.

The copolymer rubber containing the nitrile groups also includes rubbers formed by introducing carbonyl groups into the copolymer rubber containing the nitrile groups and rubbers formed by introducing the carbonyl groups into hydrogenated rubbers thereof.

As examples of the copolymer rubber containing the nitrile groups, it is possible to list acrylonitrile-butadiene rubber, acrylonitrile-isoprene rubber, acrylonitrile-butadiene-acrylate rubber, acrylonitrile-butadiene-acrylate-methacrylate rubber, hydrogenated rubber of these rubber, and rubbers formed by introducing the carbonyl groups into these rubbers.

It is preferable that the rubber component (1) contains the acrylonitrile-butadiene rubber (hereinafter referred to as NBR) or/and the hydrogenated acrylonitrile-butadiene rubber (hereinafter referred to as HNBR). It is most favorable to use the hydrogenated acrylonitrile-butadiene rubber (hereinafter referred to as HNBR) having residual double bonds not more than 10%.

The NBR and the HNBR have a high tensile strength, tear strength, and resistance to fracture respectively and in addition are capable of realizing a uniform crosslinking density and uniform wear in the edge of the cleaning blade. Therefore unlike the conventional cleaning blade made of polyurethane, the edge of the cleaning blade composed of the thermosetting elastomer composition containing the NBR or the HNBR can be prevented from wearing nonuniformly. Thereby the cleaning blade of the present invention is capable of preventing stress from being concentrated on a part of the edge, displaying a preferable cleaning performance.

As the NBR or the NBR which is used as the material of the HNBR, it is possible to use any of low-nitrile NBR having the bound acrylonitrile amount of not more than 25%, intermediate-nitrile NBR having the bound acrylonitrile amount of 25% to 31%, moderate high-nitrile NBR having the bound acrylonitrile amount of 31% to 36%, and high-nitrile NBR having the bound acrylonitrile amount of not less than 36%.

It is more favorable to use the moderate high-nitrile NBR having the bound acrylonitrile amount of 31% to 35% and the high-nitrile NBR having the bound acrylonitrile amount of 36 to 50%.

It is more favorable to use the HNBR having the bound acrylonitrile amount of 21% to 46% and a Mooney viscosity ML1+4(100° C.) of 20 to 160.The reason the bound acrylonitrile amount of the HNBR is set to 21% to 46% is as follows: If the bound acrylonitrile amount of the HNBR is less than 21%, the resulting thermosetting elastomer composition has an inferior mechanical property. On the other hand, if the bound acrylonitrile amount of the HNBR is more than 46%, the resulting thermosetting elastomer composition has a high glass transition temperature Tg and a low cleaning performance at a low temperature and humidity. The bound acrylonitrile amount of the HNBR is favorably in the range of 21% to 44% and more favorably in the range of 31% to 35%. If the Mooney viscosity ML1+4(100° C.) of the HNBR is less than 20, the resulting thermosetting elastomer composition has a low molecular weight and a low wear resistance. On the other hand, if the Mooney viscosity ML1+4(100° C.) is more than 160, the resulting thermosetting elastomer composition has an excessive molecular weight distribution. Thereby it is difficult to perform kneading and molding operations. The Mooney viscosity ML1+4(100° C.) of the HNBR is more favorably in the range of 40 to 150. The Mooney viscosity is measured in accordance with JIS K 6300.

It is preferable that the rubber component (1) consists of the NBR or/and the HNBR, but as desired, other rubber may be combined with the NBR or/and the HNBR. As the other rubber, any of the above-listed rubbers can be used. It is especially favorable to use the butadiene rubber or the styrene butadiene rubber.

As the rubber component (1), it is possible to use rubber in which a component other than the rubber component (1) contained in the thermosetting elastomer composition composing the cleaning blade of the present invention rubber is finely dispersed.

As the base polymer of the rubber having the above-described mode, any of the rubber listed above may be used. It is favorable to use the NBR or/and the HNBR. It is more favorable to use the HNBR.

As the component, other than the rubber component (1), which is finely dispersed in the rubber, the filler (2) is favorable. Of the filler (2), a co-crosslinking agent is more favorable. Of the co-crosslinking agent, metal salts of α,β-unsaturated carboxylic acids are especially favorable. By finely dispersing the co-crosslinking agent in the rubber to a high extent, the finely dispersed co-crosslinking agent makes a graft polymerization reaction at a crosslinking time to form a fine structure. The resulting thermosetting elastomer composition has a high mechanical property.

It is preferable that the thermosetting elastomer composition composing the cleaning blade of the present invention contains one or more kinds of the filler (2) selected from the group consisting of a co-crosslinking agent, a vulcanization accelerator, a vulcanization-accelerating assistant agent, an age resistor, a softener for rubber, a reinforcing agent, and other kinds of additives.

It is favorable that the mixing amount of the filler (2) for 100 parts of the rubber component (1) by mass is set to 0.1 to 80 parts by mass. If the mixing amount of the filler (2) is less than 0.1 parts by mass, there is a fear that the rubber component is not sufficiently reinforced or not sufficiently vulcanized. On the other hand, if the mixing amount of the filler (2) is more than 80 parts by mass, the hardness of the thermosetting elastomer composition is so hard that there is a fear that the cleaning blade of the present invention for use in the image-forming apparatus may damage the photoreceptor.

The co-crosslinking agent crosslinks itself and reacts with rubber molecules to crosslink them, thus making the entire elastomer composition polymeric.

The mixing amount of the co-crosslinking agent should be large enough to allow the rubber component to be vulcanized. Normally the mixing amount of the co-crosslinking agent is selected from the range of 0 to 20 parts by mass and favorably 0.1 to 10 parts by mass for 100 parts by mass of the rubber component.

As the co-crosslinking agent, it is possible to use ethylene unsaturated monomers represented by methacrylate ester and metal salts of methacrylic acid or acrylic acid; polyfunctional polymers utilizing the functional group of 1,2-polybutadiene; and dioximes.

As the ethylene unsaturated monomer, the following substances are listed:

(a) Monocarboxylic acids such as acrylic acid, methacrylic acid, crotonic acid, and the like.

(b) Dicarboxylic acids such as maleic acid, fumaric acid, itaconic acid, and the like.

(c) Ester or anhydride of the above-described (a) and (b)

(d) Metal salts of the above-described (a) through (c)

(e) Aliphatic conjugated dienes such as 1,3-butadiene, isoprene, 2-chloro-1,3-butadiene, and the like (f) Aromatic vinyl compounds such as styrene, α-methylstyrene, vinyltoluene, ethyl vinylbenzene, divinylbenzene, and the like (g) Vinyl compounds having a heterocyclic ring such as triallyl isocyanurate, triallyl cyanurate, and vinylpyridine (h) Vinyl cyanide compounds such as (metha)acrylonitrile and α-chloroacrylonitrile, acrolein, formylstyrol, vinyl methyl ketone, vinyl ethyl ketone, and vinyl butyl ketone.

As the "ester of the monocarboxylic acids" of the above-described (c), the following substances are listed:

alkyl esters of (metha)acrylic acid such as methyl (metha) acrylate, ethyl (metha)acrylate, n-propyl (metha)acrylate, i-propyl (metha)acrylate, n-butyl (metha)acrylate, i-butyl (metha)acrylate, n-pentyl (metha)acrylate, i-pentyl (metha) acrylate, n-hexyl (metha)acrylate, cyclohexyl (metha)acrylate, 2-ethylhexyl (metha)acrylate, octyl (metha)acrylate, i-nonyl (metha)acrylate, tert-butyl cyclohexyl (metha)acrylate, decyl (metha)acrylate, dodecyl (metha)acrylate, hydroxymethyl (metha)acrylate; hydroxyethyl (metha)acrylate;

amino alkyl esters of (metha)acrylic acid such as aminoethyl acrylate, dimethylaminoethyl acrylate, butylaminoethyl acrylate, and the like;

(metha)acrylate having an aromatic ring such as benzyl (metha)acrylate, benzoyl (metha)acrylate, allyl (metha)acrylate, and the like;

(metha)acrylate having an epoxy group such as glycidyl (metha)acrylate, methaglycidyl (metha)acrylate, epoxycyclohexyl (metha)acrylate, and the like;

(metha)acrylate having functional groups such as N-methylol(metha)acrylamide, γ-methacryloxypropyltrimethoxysilane; tetrahydrofurfuryl (metha)acrylate, and the like; and (metha)acrylate having a polyfunctional group such as ethylene glycol di(metha)acrylate, trimethylolpropane tri (metha)acrylate, ethylene dimethacrylate (EDMA), polyethylene glycol dimethacrylate, isobutylene ethylene dimethacrylate, and the like.

As the "esters of dicarboxylic acids" of the above-described (c), half esters such as methyl maleate, methyl itaconate; diallyl phthalate, diallyl itaconate, and the like are listed.

As the "anhydrides of the unsaturated carboxylic acids" of the above-described (c), anhydride of acrylic acid, anhydride of maleic acid, and the like are listed.

As the "metal salts" of the above-described (d), sodium salts, aluminum salts, calcium salts, zinc salts, and magnesium salts of unsaturated carboxylic acids such as acrylic acid, methacrylic acid, maleic acid, and fumaric acid are listed.

As the ethylene unsaturated monomer that can be preferably used in the present invention, the following substances are listed:

methacrylic acid;

higher ester of methacrylic acid such as trimethylolpropane trimethacrylate (TMPT), ethylene dimethacrylate (EDMA), polyethylene glycol dimethacrylate, cyclohexyl methacrylate, allyl methacrylate, tetrahydrofurfuryl methacrylate, and isobutylene ethylene dimethacrylate;

metal salts of α,β-unsaturated carboxylic acids such as zinc salts, sodium salts, magnesium salts, calcium salts, aluminum salts of acrylic acid, methacrylic acid, fumaric acid, maleic acid, and the like; and triallyl isocyanurate, triallyl cyanurate, diallyl phthalate, diallyl itaconate, vinyl toluene, vinyl pyridine, and divinylbenzene.

The methacrylic acid and the metal salt of the α,β-unsaturated carboxylic acids are favorable. As the metal salt of the α,β-unsaturated carboxylic acids, the metal salt of the methacrylic acid and that of the acrylic acid are more favorable.

As the metal salt of the methacrylic acid or that of the acrylic acid, it is possible to list aluminum acrylate, aluminum methacrylate, zinc acrylate, zinc methacrylate, calcium acrylate, calcium methacrylate, magnesium acrylate, and magnesium methacrylate. It is favorable to use the zinc acrylate or the zinc methacrylate. It is most favorable to use the zinc methacrylate.

As the polyfunctional polymers, those utilizing the functional group of 1,2-polybutadiene are listed. More specifically, Buton 150, Buton 100, polybutadiene R-15, Diene-35, Hystal-B2000, and the like are listed.

As the above-described dioximes, p-quinonedioxime, p,p'-dibenzoyl quinonedioxime, N,N'-m-phenylenebismaleimide, and the like are listed.

As the vulcanization accelerator, both inorganic accelerators and organic accelerators can be used.

As the inorganic accelerator, it is possible to use slaked lime, magnesium oxide, titanium oxide, and litharge (PbO).

As the organic accelerator, thiurams, thiazoles, thioureas, dithiocarbamates, guanidines, and sulfeneamides are listed.

As the thiurams, tetramethylthiuram monosulfide, tetramethylthiuram disulfide, tetraethylthiuram disulfide, tetrabutylthiuram disulfide, and dipentamethylenethiuram tetrasulfide are listed.

As the thiazoles, it is possible to list 2-mercaptobenzothiazole, dibenzothiazyl disulfide, N-cyclohexyl benzothiazole, and the like.

As the thioureas, N,N'-diethylthiourea, ethylenethiourea, and trimethylthiourea are listed.

As the dithiocarbamates, zinc dimethyl dithiocarbamate, zinc diethyl dithiocarbamate, zinc dibutyl dithiocarbamate, sodium dimethyl dithiocarbamate, sodium diethyl dithiocarbamate, copper dimethyl dithiocarbamate, ferric dimethyl dithiocarbamate (III), selenium diethyl dithiocarbamate, and tellurium diethyl dithiocarbamate are listed.

As the guanidine accelerator, it is possible to list di-o-tolyl guanidine, 1,3-diphenyl guanidine, 1-o-tolylbiguanide, and di-o-tolylguanidine salts of dicatechol borate.

As the sulfenamides, it is possible to list N-cyclohexyl-2-benzothiazolylsulfenamide, N-oxydiethylene-2-benzothiazolylsulfenamide, N-tert-butyl-2-benzothiazolylsulfenamide, and N,N'-dicyclohexyl-2-benzothiazolylsulfenamide.

The mixing amount of the vulcanization accelerator should be large enough to allow the property of the rubber component to be sufficiently displayed. In the case of an inorganic vulcanization accelerator, the mixing amount thereof is selected in the range of 0 to 15 parts by mass with respect to 100 parts by mass of the rubber component. In the case of an organic vulcanization accelerator, the mixing amount thereof is selected in the range of 0.5 to 3 parts by mass with respect to 100 parts by mass of the rubber component.

The vulcanization-accelerating assistant agent that is used in the present invention includes metal oxides such as zinc oxide; fatty acids such as stearic acid, oleic acid, cotton seed fatty acid; and known vulcanization-accelerating assistant agents. The metal oxides such as the zinc oxide also serve as reinforcing agents described below.

The mixing amount of the vulcanization-accelerating assistant agent should be large enough to allow the property of the rubber component to be sufficiently displayed. The mixing amount of the vulcanization-accelerating assistant agent is set to the range of 0.5 to 20 parts by mass and favorably 1 to 15 parts by mass for 100 parts by mass of the rubber component.

As the age resistor, amines, phenols, imidazoles, and phosphorus-containing substances, and thioureas are listed.

As the amines, phenyl-α-naphthylamine, 2,2,4-trimethyl-1,2-dihydroquinoline polymer (TMDQ), 6-ethoxy-2,2,4-trimethyl-1,2-dihydroquinoline (ETMDQ), p,p'-dioctyldiphenylamine (ODPA), p,p'-dicumyldiphenylamine (DCDP), N,N'-di-2-naphthyl-p-phenylenediamine (DNPD), N,N'-diphenyl-p-phenylenediamine (DPPD), N-phenyl-N'-isopropyl-p-phenylenediamine (IPPD), and N-phenyl-N'-1,3-dimethylbutyl-p-phenylenediamine (6PPD) are listed.

The phenols that are used in the present invention includes 2,6-di-tert-butyl-4-methyl phenol (BHT or DTBMP); styrenated methyl phenol; 2,2'-methylene bis(4-methyl-6-tert-butyl phenol) (MBMBP); 2,2'-methylene bis(4-ethyl-6-tert-butyl phenol); 4,4'-thiobis(3-methyl-6-tert-butyl phenol) (TBMTBP); 4,4'-butylidene bis(3-methyl-6-tert-butyl phenol) (BBMTBP); 2,5-di-tert-butyl hydroquinone (DBHQ); and 2,5-di-tert-amyl hydroquinone (DAHQ).

As the imidazoles, 2-mercaptobenzimidazole (MBI), zinc salts of 2-mercaptobenzimidazole (ZnMBI), and nickel dibutyldithiocarbamate (NiBDC) are listed.

As other age resistors, it is possible to use phosphorus-containing substances such as tris(nonyl phenyl)phosphite; thioureas such as 1,3-bis(diaminopropyl)-2-thiourea, tributyl thiourea, and the like; and wax for preventing ozone-caused deterioration.

The mixing amount of the age resistor should be large enough to allow the property of the rubber component to be sufficiently displayed. It is possible to combine not less than two kinds thereof. It is favorable that the mixing amount of the age resistor is set to 0.1 to 15 parts by mass for 100 parts by mass of the rubber component (1). The reason the mixing amount of the age resistor is set to 0.1 to 15 parts by mass for 100 parts by mass of the rubber component (1) is as follows: When the mixing amount of the age resistor is less than 0.1 parts by mass, the effect of the age resistor is not displayed. Thus there is a fear that the resulting thermosetting elastomer composition has an inferior mechanical property and an excessive wear. On the other hand, when the mixing amount of the age resistor exceeds 15 parts by mass, the age resistor is dispersed unfavorably owing to an excessive mixing amount thereof. Thereby there is a fear that the thermosetting elastomer composition has an inferior mechanical property. It is more favorable that the mixing amount of the age resistor is set to 0.5 to 10 parts by mass for 100 parts by mass of the rubber component (1).

As the softener for rubber, it is possible to use derivatives of phthalic acid, isophthalic acid, adipic acid, sebacic acid, benzoic acid, and phosphoric acid.

More specifically, it is possible to list dioctyl phthalate (DOP), dibutyl phthalate (DBP), di-(2-ethylhexyl)phthalate, di-iso-octyl phthalate (DIOP), higher alcohol phthalate, di-(2-ethylhexyl)sebacate, polyester adipate, dibutyl diglycol adipate, di(butoxyethoxyethyl)adipate, iso-octyl-tall oil fatty ester, tributyl phosphate (TBP), tributoxyethyl phosphate (TBEP), tricresyl phosphate (TCP), cresyl diphenyl phosphate (CDP), and diphenyl alkane.

The mixing amount of the softener for rubber should be large enough to allow the property of the rubber component to be sufficiently displayed. The mixing amount of the softener is selected in the range of 0.5 to 5 parts by mass for 100 parts by mass of the rubber component.

As the reinforcing agent, in addition to carbon black mainly used as a filler for guiding an interaction of the carbon black with the rubber, it is possible to use inorganic reinforcing agents such as white carbon (silica filler such as dry silica or wet silica, silicate such as magnesium silicate), calcium carbonate, magnesium carbonate, magnesium silicate, clay (aluminum silicate), silane-modified clay, and talc; and organic reinforcing agents such as coumarone and indene resin, phenol resin, high-styrene resin, and wood meal.

It is preferable to use the carbon black excellent in its reinforcing effect, dispersibility, and wear resistance, and low in cost. As the carbon black, it is preferable to use SAF carbon (average particle diameter: 18 to 22 nm), SAF-HS carbon (average particle diameter: about 20 nm), ISAF carbon (average particle diameter: 19 to 29 nm), N-339 carbon (average particle diameter: about 24 nm), ISAF-LS carbon (average particle diameter: 21 to 24 nm), I-ISAF-HS carbon (average particle diameter: 21 to 31 nm), HAF carbon (average particle diameter: about 26 to 30 nm), HAF-HS carbon (average particle diameter: 22 to 30 nm), N-351 carbon (average particle diameter: about 29 nm), HAF-LS carbon (average particle diameter: about 25 to 29 nm), LI-HAF carbon (average particle diameter: about 29 nm), MAF carbon (average particle diameter: 30 to 35 nm), FEF carbon (average particle diameter: about 40 to 52 nm), SRF carbon (average particle diameter: 58 to 94 nm), SRF-LM carbon, and GPF carbon (average particle diameter: 49 to 84 nm) are listed. It is especially favorable to use the FEF carbon, the ISAF carbon, the SAF carbon or the HAF carbon.

The mixing amount of the reinforcing agent for rubber should be large enough to allow the property of the rubber component to be sufficiently displayed. The mixing amount of the reinforcing agent is selected in the range of 5 to 100 parts by mass for 100 parts by mass of the rubber component.

As the above-described additives, amide compounds, metal salts of fatty acids, and wax are listed.

As the amide compounds, aliphatic amide compounds and aromatic amide compounds are listed. As the aliphatic amide compounds, amides of oleic acid, stearic acid, erucic acid, caproic acid, caprylic acid, capric acid, lauryl acid, myristic acid, palmitic acid, arachidic acid, behenic acid, palmitoleic acid, eicosenoic acid, erucic acid, elaidic acid, trans-11-eicosenoic acid, trans-13-docosenoic acid, linolic acid, linolenic acid, and ricinoleic acid are listed. These aliphatic amide compounds may be used singly or as a mixture of two or more kinds thereof. As the aliphatic amide compounds, it is preferable to use oleic acid amide, stearic acid amide, and erucic acid amide are especially preferable.

To form the metal salts of the fatty acids, as fatty acids, lauryl acid, stearic acid, palmitic acid, myristic acid, and oleic acid are listed. As metals, zinc, iron, calcium, aluminum, lithium, magnesium, strontium, barium, cerium, titanium, zirconium, lead, and manganese are listed.

As the wax, paraffin wax, montan wax, and amide wax are listed.

The mixing amount of these additives should be large enough to allow the property of the rubber component to be sufficiently displayed. In the present invention, the mixing amount of the additives for 100 parts by mass of the rubber component is selected in the range of 1 to 10 parts by mass.

It is preferable that as the crosslinking agent (3), the thermosetting elastomer composition composing the cleaning blade of the present invention contains one or not less than two kinds of substances selected from the group consisting of sulfur, an organic sulfur-containing compound, an organic peroxide, a heat-resistant crosslinking agent, and a resin crosslinking agent.

It is preferable to set the mixing amount of the vulcanizing agent (3) to 0.1 to 30 parts by mass for 100 parts by mass of the rubber component (1) for the following reason: If the mixing amount of the crosslinking agent (3) is less than 0.1 parts by mass, the vulcanizing density becomes small and there is a fear that the thermosetting elastomer composition is not provided with a desired property. On the other hand, if the mixing amount of the vulcanizing agent (3) is more than 30 parts by mass, owing to an excessive crosslinking reaction, the hardness of the thermosetting elastomer composition is so high that there is a fear the cleaning blade for use in a image-forming apparatus of the present invention may damage the photoreceptor.

More specifically, it is preferable to set the mixing amount of the sulfur or that of the organic sulfur-containing compound for 100 parts by mass of the rubber component to 0.1 to 20 parts by mass. The mixing amount of the organic peroxide for 100 parts by mass of the rubber component is set to favorably 0.5 to 10 parts by mass and more favorably 1 to 6 parts by mass. The mixing amount of the resin crosslinking agent for 100 parts by mass of the rubber component is set to favorably 5 to 20 and more favorably 10 to 20 parts by mass.

The sulfur is used by pulverizing recovered sulfur to use it in the form of fine powder. Surface-treated sulfur having improved dispersibility can be appropriately used. Insoluble sulfur can be also used to prevent it from blooming from unvulcanized rubber.

As the organic sulfur-containing compounds, N,N'-dithiobismorpholine, diphenyl disulfide, pentabromodisulfide, and the like are listed. It is especially favorable to use the diphenyl disulfide.

As the organic peroxides, it is possible to list benzoyl peroxide, 1,1-di-(tert-butyl peroxy)-3,3,5-trimethylcyclohexane, 2,5-dimethyl-2,5-di-(benzoyl peroxy)hexane, 2,5-dimethyl-2,5-di-(benzoyl peroxy)-3-hexyne, 2,5-dimethyl-2,5-di-(tert-butyl peroxy)hexane, di-tert-butyl peroxy-di-isopropylbenzene, di-tert-butyl peroxide, di-tert-butylperoxybenzoate, dicumyl peroxide, tert-butyl cumyl peroxide, 2,5-dimethyl-2,5-di-(tert-butyl peroxy)-3-hexyne, 1,3-bis(tert-butyl peroxyisopropyl)benzene, n-butyl-4,4-bis (tert-butyl peroxy)valerate, p-chlorobenzoyl peroxide, 2,4-dichlorobenzoyl peroxide, tert-butyl peroxyisopropyl carbonate, diacetyl peroxide, lauroyl peroxide.

The heat-resistant crosslinking agent which is used in the present invention includes 1,3-bis(citraconimide methyl) benzene, hexamethylene-1,6-sodium bisthiosulfate-dihydrate, and 1,6-bis(dibenzylthiocarbamoyl disulfide)hexane.

As the resin crosslinking agent, alkylphenol resin or bromized alkylphenol formaldehyde resin such as TACKROL 201 (produced by TAOKA CHEMICAL CO., LTD.), TACKROL 250-III (produced by TAOKA CHEMICAL CO., LTD.), and Hitanol 2501 (produced by Hitachi Chemical Co., Ltd.) are listed. It is especially preferable to use the alkylphenol resin.

The mode of the thermosetting elastomer composition composing the cleaning blade of the present invention for use in an image-forming apparatus is not specifically limited, provided that the thermosetting elastomer composition contains the above-described components. But it is especially preferable that the thermosetting elastomer composition contains the rubber component (1), the filler (2), the crosslinking agent (3), and the dispersion-improving agent (4) and has a mode (I) or a mode (II).

(I) As the filler (2), the thermosetting elastomer composition contains at least a metal salt of α,β-unsaturated carboxylic acid or a mixture of the α,β-unsaturated carboxylic acid and a metal oxide.

(II) As the rubber component (1), the thermosetting elastomer composition contains rubber consisting of HNBR in which the metal salt of the α,β-unsaturated carboxylic acid is dispersed.

In both the modes (I) and (II), the metal salt of the α,β-unsaturated carboxylic acid functions as a co-crosslinking agent and makes a polymerization graft reaction at a crosslinking time to form a fine structure. The resulting thermosetting elastomer composition has a higher mechanical property and a higher wear resistance than conventional thermosetting elastomer compositions reinforced with carbon black. The dispersion-improving agent (4) has a function of appropriately stopping a chain reaction of the metal salt of the α,β-unsaturated carboxylic acid. The stopping reaction allows the polymerization graft reaction by the metal salt of the α,β-unsaturated carboxylic acid to uniformly take place. Thereby the edge of the cleaning blade wears uniformly and the cleaning performance of the cleaning blade can be improved.

As the metal salt of the α,β-unsaturated carboxylic acid in the modes (I) and (II), it is possible to list sodium salts, aluminum salts, calcium salts, zinc salts, and magnesium salts of unsaturated carboxylic acids such as acrylic acid, methacrylic acid, maleic acid, and fumaric acid. Zinc methacrylate is preferable.

The thermosetting elastomer composition having the mode (I) is described in detail below.

Instead of mixing the metal salt of the α,β-unsaturated carboxylic acid with the rubber component, the mixture of the α,β-unsaturated carboxylic acid and the metal oxide may be mixed therewith. When the mixture of the α,β-unsaturated carboxylic acid and the metal oxide is mixed with the rubber component, the metal salt of the α,β-unsaturated carboxylic acid is generated in a rubber composition and functions as the co-crosslinking agent. In the present invention, the metal oxide used together with the α,β-unsaturated carboxylic acid to form the metal salt of the α,β-unsaturated carboxylic acid is included in the co-crosslinking agent not in the vulcanization-accelerating assistant.

It is preferable to set the mixing ratio between the α,β-unsaturated carboxylic acid and the metal oxide to 2:1. But there is a case where the α,β-unsaturated carboxylic acid does not react with all of the metal oxide. Thus the mixing ratio between the α,β-unsaturated carboxylic acid and the metal oxide is set to 1 to 2:1 and favorably 1:1.

As the α,β-unsaturated carboxylic acid, it is possible to list acrylic acid, methacrylic acid, maleic acid, and fumaric acid. As the metal oxide, it is possible to list zinc oxide, magnesium oxide, calcium oxide, aluminum oxide, and the like. The combination of methacrylic acid and the zinc oxide is preferable.

Instead of the metal oxide, it is possible to use metal salts capable of generating the metal salt of the α,β-unsaturated carboxylic acid.

The mixing amount of the metal salt of the α,β-unsaturated carboxylic acid or that of the mixture of the α,β-unsaturated carboxylic acid and the metal oxide is set to favorably five to 60 parts by mass for 100 parts by mass of the rubber component.

If the mixing amount of the metal salt of the α,β-unsaturated carboxylic acid or that of the mixture of the α,β-unsaturated carboxylic acid and the metal oxide is less than 5 parts by mass, the co-crosslinking effect of the metal salt of the α,β-unsaturated carboxylic acid (for example, zinc methacrylate) is not displayed. Thus there is a fear that the resulting thermosetting elastomer composition has an inferior mechanical property and an excessive wear. On the other hand, if more than 60 parts by mass of the metal salt of the α,β-unsaturated carboxylic acid or the mixture of the α,β-unsaturated carboxylic acid and the metal oxide is mixed with 100 parts by mass of the rubber component, i.e., when an excessive amount of the metal salt of the α,β-unsaturated carboxylic acid or the mixture of the α,β-unsaturated carboxylic acid and the metal oxide is mixed therewith, there is a fear that the components of the thermosetting elastomer composition cannot be kneaded by a rubber kneading apparatus. The mixing amount of the metal salt of the α,β-unsaturated carboxylic acid or that of the mixture of the α,β-unsaturated carboxylic acid and the metal oxide is set to more favorably five parts by mass to 50 parts by mass for 100 parts by mass of the rubber component.

The rubber component (1), the crosslinking agent (3), and the dispersion-improving agent (4) used in the mode (I) are similar to those previously described. As the filler (2), the thermosetting elastomer composition may contain the above-described fillers in addition to the metal salt of the α,β-unsaturated carboxylic acid or the mixture of the α,β-unsaturated carboxylic acid and the metal oxide.

The thermosetting elastomer composition having the mode (II) is described in detail below.

To obtain the rubber consisting of the HNBR, serving as the base polymer, in which the metal salt of the α,β-unsaturated carboxylic acid is dispersed, the metal salt of the α,β-unsaturated carboxylic acid may be mixed with the HNBR to finely disperse the metal salt of the α,β-unsaturated carboxylic acid therein. Alternatively it is possible to mix the α,β-unsaturated carboxylic acid and the metal oxide with the HNBR so that the metal salt of the α,β-unsaturated carboxylic acid formed by the mixing is finely dispersed in the HNBR. It is also possible to use a commercially available product in which the metal salt of the α,β-unsaturated carboxylic acid is mixed with the HNBR and finely dispersed therein.

It is preferable that the HNBR serving as the base polymer has the bound acrylonitrile amount of 21% to 46% and the Mooney viscosity ML1+4(100° C.) in the range of 20 to 160.

In the mode (II), it is preferable that other rubber is combined with the rubber consisting of the HNBR in which the metal salt of the α,β-unsaturated carboxylic acid is dispersed. As the other rubber, any of the above-listed rubbers can be used. It is favorable to use the NBR or/and the HNBR.

In the mode (II), the mixing amount of the metal salt of the α,β-unsaturated carboxylic acid dispersed in the rubber consisting of the HNBR in which the metal salt of the α,β-unsaturated carboxylic acid is dispersed and the mixing ratio between the rubber and the other rubber should be so determined that the mixing amount of the metal salt of the α,β-unsaturated carboxylic acid is 5 to 60 parts by mass and favorably 5 to 50 parts by mass for 100 parts by mass of the entire rubber component.

It is preferable to use the rubber in which 40 to 240 parts by mass, favorably 80 to 120 parts by mass, and most favorably 91 to 115 parts by mass of the metal salt of the α,β-unsaturated carboxylic acid is used for 100 parts by mass of the HNBR.

It is preferable that the rubber in which 91 to 115 parts by mass of the metal salt of the α,β-unsaturated carboxylic acid is dispersed for 100 parts by mass of the HNBR is used at 10 to 75 parts by mass and favorably at 30 to 60 parts by mass for 100 parts by mass of the entire rubber component.

The rubber in which 91 to 115 parts by mass of the metal salt of the α,β-unsaturated carboxylic acid is dispersed for 100 parts by mass of the HNBR is used at 10 to 75 parts by mass for 100 parts by mass of the entire rubber component for the following reason: If the mixing amount of the rubber is less than 10 parts by mass, the amount of the metal salt of the α,β-unsaturated carboxylic acid for 100 parts by mass of the rubber component is less than 5 parts by mass. Thereby the co-crosslinking effect of the metal salt of the α,β-unsaturated carboxylic acid is not displayed. Thus there is a fear that the resulting thermosetting elastomer composition has an inferior mechanical property and an excessive wear. On the other hand, if the mixing amount of the rubber is more than 75 parts by mass, the amount of the metal salt of the α,β-unsaturated carboxylic acid for 100 parts by mass of the rubber component is more than 60 parts by mass. Thereby owing to an excessive amount of the metal salt of the α,β-unsaturated carboxylic acid, there is a fear that the components of the thermosetting elastomer composition cannot be kneaded by a rubber kneading apparatus or unreacted substances disperse unfavorably or agglomerates are generated, which adversely affects the wear resistance of the thermosetting elastomer composition.

The filler (2), the crosslinking agent (3), and the dispersion-improving agent (4) in the mode (II) are similar to those described previously.

Because the metal salt of the α,β-unsaturated carboxylic acid is added to the rubber component (1) in advance, it is unnecessary to add the metal salt of the α,β-unsaturated carboxylic acid or the mixture of the α,β-unsaturated carboxylic acid and the metal oxide to the rubber component (1) as the filler (2) again.

The cleaning blade of the present invention for use in an image-forming apparatus can be produced from the thermosetting elastomer composition containing the above-described components, as described below.

Initially the thermosetting elastomer composition is obtained by mixing the above-described components with one another by using a rubber kneading apparatus such as a single-screw extruder, a 1.5-screw extruder, a twin-screw extruder, an open roll, a kneader, a Banbury mixer or a heated roller.

The order of mixing the components is not specifically limited, but it is possible to supply the components to the kneading apparatus all together. It is also possible to supply a part of the components to the kneading apparatus, knead them to obtain a mixture, add remaining components to the mixture, and re-perform a kneading operation. It is preferable to carry out a method of kneading the rubber component (1) and the filler (2) in advance to obtain a mixture, add the crosslinking agent (3) and the dispersion-improving agent (4) to the mixture, and thereafter re-performing a kneading operation.

The kneaded components may be crosslinked before or after the kneaded material is molded or simultaneously with molding of the kneaded components to shorten a working period of time. In producing the cleaning blade of the present invention for use in the image-forming apparatus by performing a crosslinking operation simultaneously with the molding of the kneaded components, a desired die is heated and the kneaded components is filled in the die to compression-mold (press vulcanization) the kneaded components.

One embodiment of the cleaning blade of the present invention for use in an image-forming apparatus is shown in FIG. 1.

Normally, the cleaning blade 10 is bonded to a supporting member 21 with an adhesive agent. The supporting member 21 is composed of a rigid metal, an elastic metal, plastic or ceramic. It is favorable that the supporting member 21 is made of metal. As the adhesive agent for bonding the cleaning blade 10 and the supporting member 21 to each other, a polyamide or polyurethane hot-melt adhesive agent and an epoxy or phenol adhesive agent are used. It is preferable to use the hot-melt adhesive agent.

The cleaning blade 10 has a surface 10*a* opposed to a member to be cleaned, a back surface 10*c* to which the supporting member 21 is bonded, and a thickness surface 10*b* orthogonal to the surface 10*a* and the back surface 10*c*. An edge portion 10*d* sandwiched between the surface 10*a* and the thickness surface 10*b* removes toner with the edge portion 10*d* in contact with the member to be cleaned.

It is preferable that the cleaning blade of the present invention has properties described below.

It is preferable that the thermosetting elastomer composition composing the cleaning blade of the present invention has a modulus of repulsion elasticity of 50 to 70%. The wear resistance of the edge of the cleaning blade can be improved by composing the cleaning blade of the thermosetting elastomer composition having a high modulus of repulsion elasticity.

By using a compressed ball produced in the same method as that used to produce the cleaning blade of the present invention, the modulus of repulsion elasticity of the thermosetting elastomer composition is measured at 23° C. in accordance with the Lupke type test of JIS K 6255.

It is preferable that the thermosetting elastomer composition composing the cleaning blade of the present invention for use in the image-forming apparatus shows 35 to 55 MPa in the tensile strength thereof. If the tensile strength of the thermosetting elastomer composition is less than 35 MPa, the cleaning blade is frail and wears excessively.

A dumbbell specimen No. 3 is punched out of a sheet, having a thickness of 2 mm, which is formed in the same method as that used to form the cleaning blade of the present invention. The tensile strength of the specimen is measured at a pulling rate of 500 mm/minute in accordance with JIS K 6251.

It is favorable that a wear indication value of the cleaning blade of the present invention for use in the image-forming apparatus is set to favorably not more than 40 μm and more favorably not more than 30 μm when the wear indication value is measured after a paper supply test for image formation is conducted by mounting the cleaning blade on the image-forming apparatus. It is preferable that the lower limit of the wear indication value of the cleaning blade is as close as zero but is not less than 1 μm.

That the sectional length of the worn surface is less than 1 μm means that the thermosetting elastomer composition does not wear, which does not occur actually. Therefore the lower limit of the wear indication value of the cleaning blade is set to not less than 1 μm. The upper limit of the wear indication value of the cleaning blade is set to not more than 40 μm for the reason described below. If the upper limit of the wear indication value of the cleaning blade is more than 40 μm, the edge thereof wears to a high extent. Thus there is a fear that defective cleaning of toner is made.

The cleaning performance value of the cleaning blade of the present invention for use in the image-forming apparatus is favorably not more than 0.5 and more favorably not more than 0.4,when the cleaning performance value is measured after the paper supply test for image formation is conducted by mounting it on the image-forming apparatus.

That the cleaning performance value is zero means that toner is all removed. The cleaning blade whose cleaning performance value is zero has the most favorable cleaning performance. The cleaning performance value of the cleaning blade is set to not more than 0.5 for the reason described below. If the cleaning performance value of the cleaning blade is more than 0.5, the mount of the toner which remains on surface of photoreceptor after cleaning blade slidingly contacts surface thereof is large. In this case, there is a fear that a printed image is adversely affected.

The wear indication value and the cleaning performance value are measured and evaluated in the following manner after the paper supply test for image formation is conducted by mounting the cleaning blade on the image-forming apparatus.

Initially the paper supply test for image formation is conducted. More specifically, a cleaning blade punched in a predetermined size out of a sheet, made of the thermosetting elastomer composition, which has a thickness of 2 mm is bonded to a supporting member. Thereafter the cleaning blade is mounted on the image-forming apparatus with the cleaning blade in contact with a photoreceptor. The image-forming apparatus is a printer in which the photoreceptor rotates and toner can be developed. The toner has an average volume particle diameter of 5 to 10 μm, is pulverized, and has a spherical degree of 0.90 to 0.99. Print was made on 150,000 sheets at 4% print concentration at a temperature of 23° C. and a relative humidity of 55% by rotating the photoreceptor at a rotational speed of 200 to 500 mm/second.

Observing the edge of the cleaning blade after the paper supply test for image formation finishes, the edge is worn as shown in FIG. 2A which is a sectional view. A crosshatched portion of FIG. 2A shows a worn portion of the cleaning blade. A worn surface forms a straight line, as shown in FIG. 2A, but may form a curved line.

A sectional length Ws (23*d* in FIG. 2A) of the worn surface is the length of an inclined surface of the cleaning blade formed by connecting an end of a worn length of a surface 10*a* of the cleaning blade, namely, an end of a worn depth Wm (23*a* in FIG. 2A) which is the depth-direction worn length and an end of a worn length on a thickness surface 10*b* of the cleaning blade, namely, a worn end of a worn width Wc (23*b* in FIG. 2A) which is the longitudinal worn length to each other. The wear indication value is measured as the horizontal distance of the sectional length Ws of the worn surface when the sectional length Ws of the worn surface inclines at 45 degrees. More specifically, after the paper supply test for image formation finishes, the cleaning blade taken out of the image-forming apparatus is inclined by 45° so that the surface 10*a* thereof is disposed at the upper side thereof from a state in which the cleaning blade is erect, namely, a state in which the thickness surface 10*b* thereof is horizontal to the ground. FIG. 2B is an enlarged sectional view of the distal portion of the cleaning blade when the cleaning blade is inclined by 45°. The horizontal distance (24 in FIG. 2B) of the sectional length Ws (23*d* in FIG. 2A) is the wear indication value.

After the paper supply test for image formation finishes, the amount of toner supplied to the photoreceptor per unit area is computed beforehand to obtain a toner amount Ta on the surface of the photoreceptor before the cleaning blade slidingly contacts the surface of the photoreceptor. The photoreceptor is rotated to remove the toner by the cleaning blade. Thereafter the amount of the toner present on the surface of the photoreceptor disposed rearward from the cleaning blade is converted into an amount per unit area to obtain a toner amount Tb which remains on the surface of the photoreceptor after the cleaning blade slidingly contacts the surface thereof. In this manner, the toner amount Tb which remains on the surface of the photoreceptor after the cleaning blade slidingly contacts the surface thereof is obtained. The cleaning performance value=(toner amount Tb which remains on surface of photoreceptor after cleaning blade slidingly contacts surface thereof)/(toner amount Ta before cleaning blade slidingly contacts surface of photoreceptor).

The edge of the cleaning blade can be improved the wear resistance by improving the repulsion elasticity of the thermosetting elastomer composition composing the cleaning blade of the present invention for use in the image-forming apparatus. By improving the wear resistance of the edge, it is possible to set a high contact pressure of the edge against a member such as the photoreceptor to be cleaned. Thus the cleaning blade has a high cleaning performance. The present invention is characterized in that the relationship between the modulus of repulsion elasticity and the wear resistance as well as the line pressure and the relationship between the modulus of repulsion elasticity and the cleaning performance of the cleaning blade are utilized. More specifically, the thermosetting elastomer composition contains the thiol or/and the sulfide having the specific chemical structure as the dispersion-improving agent (4). Thereby it is possible to improve the dispersibility of the filler (2) and the modulus of repulsion elasticity of the thermosetting elastomer composition. Consequently the present invention provides the cleaning blade, for use in the image-forming apparatus, having excellent wear resistance and cleaning performance.

The fluorine-substituted benzenethiol or/and the metal salt thereof used as the dispersion-improving agent (4) provides an effect similar to that provided by the thiol or/and the sulfide. In addition, the fluorine-substituted benzenethiol or/and the metal salt thereof allow the resulting thermosetting elastomer composition to have a low hardness and a high modulus of repulsion elasticity. Therefore owing to the use of the fluorine-substituted benzenethiol or/and the metal salt thereof, the present invention provides the cleaning blade, for use in the image-forming apparatus, having excellent wear resistance and cleaning performance.

BRIEF DESCRIPTION OF THE DRAWINGS

FIG. 2 explains a method of measuring a wear indication value.

DETAILED DESCRIPTION OF THE PREFERRED EMBODIMENTS

A cleaning blade 10 of the present invention for use in an image-forming apparatus is bonded to a supporting member 21 with a hot melt adhesive agent. The supporting member 21 is composed of a metal. Chrome-free SECC is favorable as the metal.

Figure 3:
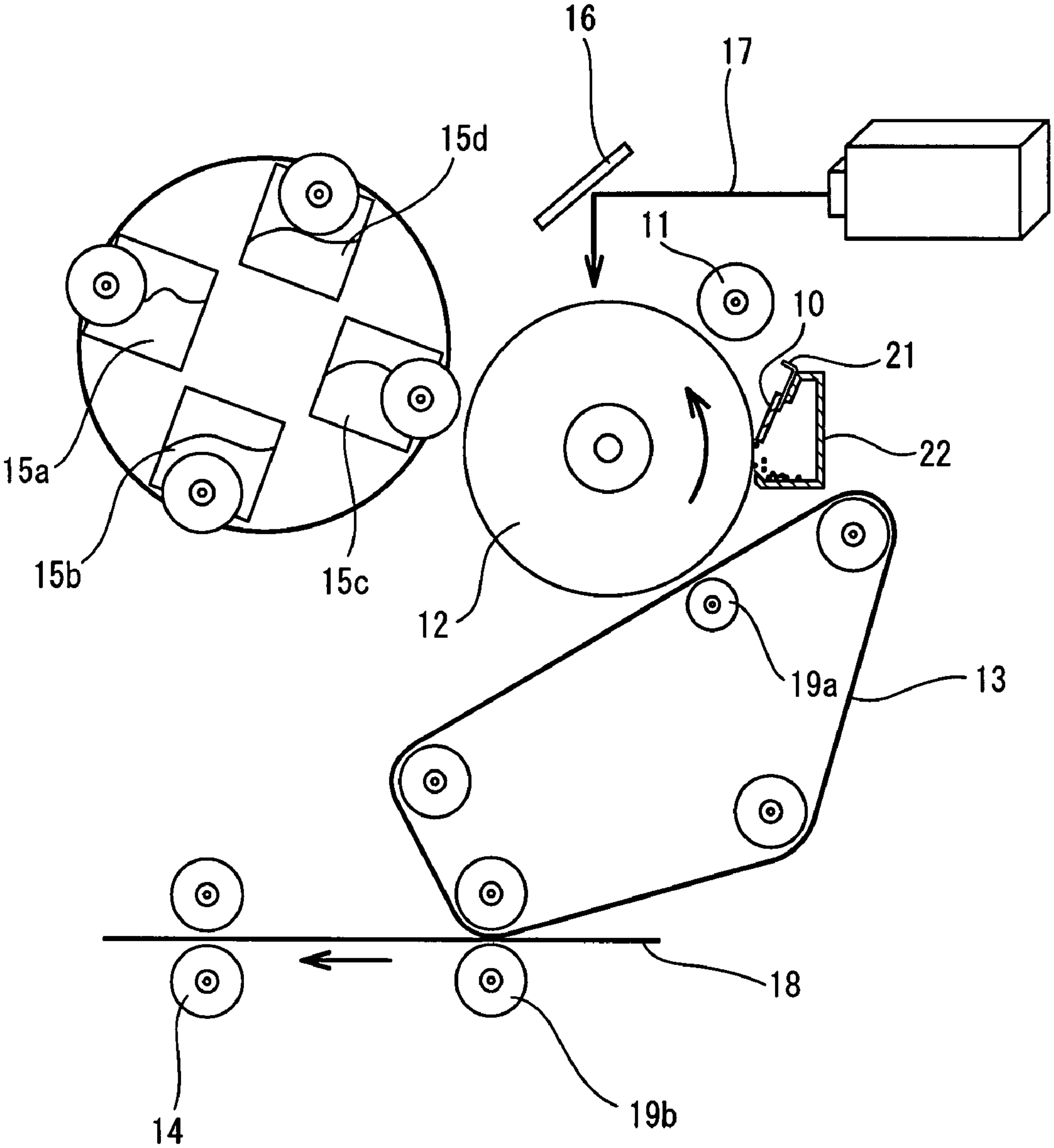
FIG. 3 is an illustrative view showing a color image-forming apparatus where the cleaning blade of the present invention is mounted.

The cleaning blade 10 of the present invention for use in the image-forming apparatus having a construction as shown in FIG. 3 is incorporated in the image-forming apparatus. The cleaning blade 10 removes toner remaining on the surface of the photoreceptor drum with the cleaning blade 10 in contact therewith. More specifically, an image is formed by a mechanism described below. The cleaning blade of the present invention for use in the image-forming apparatus removes the toner remaining on the surface of the photoreceptor drum.

Initially, a photoreceptor 12 rotates in the direction shown with the arrow of FIG. 3. After the photoreceptor 12 is charged by a charging roller 11, a laser 17 exposes a non-imaging portion of the photoreceptor 12 via a mirror 16, thus destaticizing the non-imaging portion. At this time, the portion of the photoreceptor 12 corresponding to an imaging portion is charged. Thereafter a toner 15*a* is supplied to the photoreceptor 12 and attaches to the charged imaging portion to form a first-color toner image. The toner image is transferred to an intermediate transfer belt 13 via a primary transfer roller 19*a*. In the same manner, a toner image of each of other color toners 15*b* to 15*d* formed on the photoreceptor 12 is transferred to the intermediate transfer belt 13. A full-color image composed of the four color toners 15*a* through 15*d* is formed on the intermediate transfer belt 13. The full-color image is transferred to a to-be-transferred material (normally, paper) 18 via a secondary transfer roller 19*b*. When the to-be-transferred material 18 passes between a pair of a fixing rollers 14 heated to a predetermined temperature, the full-color image is fixed to the surface thereof.

In the above-described processes, to sequentially copy the image of an original document on a plurality of recording paper, toner which has not been transferred to the intermediate transfer belt 13 but has remained on the photoreceptor 12 is removed from the surface of the photoreceptor 12 by rubbing the photoreceptor 12 with a cleaning blade 10 pressed against the surface of the photoreceptor 12 and is collected in a toner collection box 22.

The cleaning blade 10 of the first embodiment of the present invention for use in the image-forming apparatus is formed from a thermosetting elastomer composition containing components described below.

As the rubber component (1), NBR or HNBR is used.

It is preferable to use moderate high-nitrile NBR having the bound acrylonitrile amount of 31% to 35% as the NBR.

It is preferable to use the HNBR, formed by hydrogenating the moderate high-nitrile NBR, which has residual double bonds of not more than 10%.

As the filler (2), a co-crosslinking agent and an age resistor are used.

As the co-crosslinking agent, methacrylic acid and zinc oxide is added to the rubber component (1).

The sum of the mixing amount of the methacrylic acid and that of the zinc oxide is set to 5 to 40 and favorably 10 to 30 parts by mass for 100 parts by mass of the rubber component (1).

The mixing ratio between the methacrylic acid and the zinc oxide is set to favorably 1 to 2:1 and more favorably 1:1.

As the age resistor, it is favorable to use amines and imidazoles. It is more favorable to use p,p'-dicumyldiphenylamine and 2-mercaptobenzimidazole in combination.

The mixing amount of the age resistor is set to favorably 0.1 to 10 parts by mass and more favorably 0.5 to 5 parts by mass for 100 parts by mass of the rubber component.

As the crosslinking agent (3), organic peroxides are used. It is especially preferable to use dicumyl peroxide.

The mixing amount of the organic peroxide is set to favorably 0.5 to 10 parts by mass and more favorably 1 to 6 parts by mass for 100 parts by mass of the rubber component.

As the dispersion-improving agent (4), the thiol shown by the chemical formula (1) or the sulfide shown by the chemical formula (2) is used.

Benzenethiol is preferable as the thiol shown by the chemical formula (1).

Diphenyl disulfide or bis(pentabromophenyl)disulfide is preferable as the sulfide shown by the chemical formula (2).

These dispersion-improving agents (4) can be used singly or in combination of two or more kinds thereof.

The mixing amount of the dispersion-improving agent (4) is set to 0.05 to 15 parts by mass for 100 parts by mass of the rubber component. More specifically, it is favorable to set the mixing ratio of the thiol shown by the chemical formula (1) to 0.1 to 15 parts by mass for 100 parts by mass of the rubber component. It is favorable to set the mixing ratio of the sulfide shown by the chemical formula (2) to 0.05 to 10 parts by mass for 100 parts by mass of the rubber component. When the thiol shown by the chemical formula (1) and the sulfide shown by the chemical formula (2) are combined with each other, it is favorable to set the mixing ratio of the mixture thereof to 0.1 to 15 parts by mass for 100 parts by mass of the rubber component.

The cleaning blade 10 of the second embodiment of the present invention for use in the image-forming apparatus is formed from a thermosetting elastomer composition containing components described below.

As the rubber component (1), rubber in which zinc methacrylate is finely dispersed in the HNBR serving as the base polymer thereof is used.

The amount of the zinc methacrylate to be dispersed in the HNBR serving as the base polymer is set to favorably 91 to 110 parts by mass for 100 parts by mass of the HNBR.

It is preferable that the HNBR serving as the base polymer has the bound acrylonitrile amount of 21% to 44% and the Mooney viscosity ML1+4(100° C.) in the range of 40 to 150.

In the second embodiment, it is preferable to use other rubber in combination with the rubber consisting of the HNBR in which the zinc methacrylate is finely dispersed. As the other rubber, the NBR or/and the HNBR are favorable. The HNBR is more favorable.

In using the rubber consisting of the HNBR in which the zinc methacrylate is finely dispersed and the other rubber in combination, the mixing ratio between the former and the other rubber is so adjusted that the mixing amount of the former is 30 to 60 parts by mass and favorably 40 to 60 parts by mass for 100 parts by mass of the entire rubber component (1).

The age resistor is used as the filler (2). The age resistor used in the second embodiment is similar to that used in the first embodiment.

The crosslinking agent (3) and the dispersion-improving agent (4) used in the second embodiment are also similar to those used in the first embodiment.

The cleaning blade 10 of the third embodiment of the present invention for use in the image-forming apparatus is formed by molding a thermosetting elastomer composition different from that of the first embodiment in the kind of the dispersion-improving agent (4) and the mixing amount thereof. More specifically, as the dispersion-improving agent (4), the fluorine-substituted benzenethiol shown by the chemical formula (3) or/and the metal salt thereof are used. The mixing amount of the dispersion-improving agent (4) is set to 0.05 to 10 parts by mass for 100 parts by mass of the rubber component (1). A zinc salt of fluorothiophenol is used as the dispersion-improving agent (4).

The thiol shown by the chemical formula (1) or/and the sulfide shown by the chemical formula (2) may be combined with the fluorine-substituted benzenethiol shown by the chemical formula (3). In this case, the whole mixing amount of the dispersion-improving agent (4) is set to 0.05 to 10 parts by mass for 100 parts by mass of the rubber component (1).

The cleaning blade 10 of the fourth embodiment of the present invention for use in the image-forming apparatus is formed by molding a thermosetting elastomer composition different from that of the second embodiment in the kind of the dispersion-improving agent (4) and the mixing amount thereof. As the dispersion-improving agent (4) of the fourth embodiment, the same kind of the dispersion-improving agent as that of the third embodiment is used in the same amount as that used in the third embodiment.

The components other than the dispersion-improving agent (4) and the mixing amount thereof are similar to those of the first embodiment.

The cleaning blade 10 of the first through fourth embodiments of the present invention for use in the image-forming apparatus is produced as described below:

Initially the rubber component (1) and the filler (2) are kneaded at 80 to 120° C. for five to six minutes with a kneading apparatus such as a single-screw extruder, a 1.5-screw extruder, a twin-screw extruder, an open roll, a kneader, a Banbury mixer, and a heated roller. If the kneading temperature is less than 80° C. and the kneading period of time is less than five minutes, the rubber component (1) is insufficiently plasticized, and the mixture is insufficiently kneaded. If the kneading temperature is more than 120° C. and the kneading period of time is more than six minutes, there is a fear that the rubber component (1) is decomposed.

After the crosslinking agent (3) and the dispersion-improving agent (4) are added to the obtained mixture, they are kneaded at 80 to 90° C. for five to six minutes by using the above-described kneading apparatus. If the kneading temperature is less than 80° C. and the kneading period of time is less than five minutes, the mixture is insufficiently plasticized and kneaded. If the kneading temperature is more than 90° C. and the kneading period of time is more than six minutes, there is a fear that the crosslinking agent (3) is decomposed.

The cleaning blade 10 of the present invention is formed by molding the thermosetting elastomer composition obtained by carrying out the above-described method. It is preferable to mold and process the thermosetting elastomer composition into the rectangular cleaning blade 10 having a thickness of 1 to 3 mm, a width of 10 to 40 mm, and a length of 200 to 500 mm.

The molding method is not specifically limited but a known method such as the injection molding or the compression molding can be used. More specifically, press vulcanization is performed at 160° C. to 170° C. for 20 to 40 minutes, with the thermosetting elastomer composition set in a die. If the vulcanizing temperature is less than 160° C. and the vulcanizing period of time is less than 20 minutes, the thermosetting elastomer composition is not sufficiently vulcanized. If the vulcanizing temperature is more than 170° C. and the vulcanizing period of time is more than 40 minutes, there is a fear that the rubber component is decomposed.

The cleaning blade 10 of the present invention for use in the image-forming apparatus has a wear indication value of favorably not more than 40 μm and more favorably in the range of 25 μm to 40 μm when the wear indication value is measured after the paper supply test for image formation in which the cleaning blade 10 is mounted on the image-forming apparatus finishes. The cleaning blade 10 has a cleaning performance value of favorably not more than 0.5 and more favorably 0.35 to 0.5 when the cleaning performance value is measured after the paper supply test for image formation in which the cleaning blade 10 is mounted on the image-forming apparatus finishes.

It is favorable that the thermosetting elastomer composition composing the cleaning blade 10 of the present invention has a modulus of repulsion elasticity of 50 to 70%. It is also favorable that the thermosetting elastomer composition has a tensile strength of 35 to 55 MPa.

Examples of the present invention and comparison examples are described below. But the present invention is not limited to the examples described below.

EXAMPLES 1 THROUGH 20 AND COMPARISON EXAMPLES 1 THROUGH 13

After the mixing amount of each of the rubber component (1) and the filler (2) shown in tables 1 through 4 was measured, the rubber component (1) and the filler (2) were supplied to a rubber kneading apparatus such as a twin-screw extruder, an open roll, a Banbury mixer or a kneader. Thereafter they were kneaded for five to six minutes while they were being heated at 80° C. to 120° C.

The obtained mixture, the crosslinking agent (3), and the dispersion-improving agent (4), the mixing amounts (unit: part by mass) of which are shown in tables 1 through 4 were supplied to the rubber kneading apparatus such as the open roll, the Banbury mixer or the kneader. Thereafter they were kneaded for five to six minutes while they were being heated to 80° C. to 90° C.

After the obtained rubber composition was set in a die, it was press-vulcanized at 160° C. for 30 minutes to obtain a sheet having a thickness of 2 mm and a compressed ball having ϕ 27.5 mm×a thickness of 12 mm.

After each cleaning blade having a width of 27 mm and a length of 320 mm was cut out of the sheet having a thickness of 2 mm, each cleaning blade was bonded to a supporting member made of chrome-free SECC with hot-melt. The central portion of the sheet was cut to obtain a cleaning member.

TABLE 1

| | | COMPARISON EXAMPLE 1 | COMPARISON EXAMPLE 2 | COMPARISON EXAMPLE 3 | COMPARISON EXAMPLE 3 | EXAMPLE 1 | EXAMPLE 2 | EXAMPLE 3 |
|---|---|---|---|---|---|---|---|---|
| RUBBER COMPONENT (1) | NBR | 100 | | | | 100 | | |
| | HNBR | | 100 | 45 | 45 | | 100 | 45 |
| | ZDMA-CONTAINING HNBR | | | 55 | 55 | | | 55 |
| FILLER (2) | METHACRYLIC ACID | 10 | 10 | | | 10 | 10 | |
| | ZINC OXIDE | 10 | 10 | | | 10 | 10 | |
| | AGE RESISTOR A | 1 | 1 | 1 | 1 | 1 | 1 | 1 |
| | AGE RESISTOR B | 2 | 2 | 2 | 2 | 2 | 2 | 2 |
| CROSSLINKING AGENT(3) | ORGANIC PEROXIDE | 3 | 3 | 3 | 3 | 3 | 3 | 3 |
| DISPERSION-IMPROVING AGENT (4) | DISPERSION-IMPROVING AGENT A | | | 0.04 | | 0.1 | 0.1 | 0.1 |
| | DISPERSION-IMPROVING AGENT B | | | | 0.04 | | | |
| | DISPERSION-IMPROVING AGENT C | | | | | | | |

TABLE 1-continued

| | COMPARISON EXAMPLE 1 | COMPARISON EXAMPLE 2 | COMPARISON EXAMPLE 3 | COMPARISON EXAMPLE 3 | EXAMPLE 1 | EXAMPLE 2 | EXAMPLE 3 |
|---|---|---|---|---|---|---|---|
| MODULUS OF REPULSION ELASTICITY (%) | 45 | 49 | 48 | 46 | 51 | 51 | 52 |
| TENSILE STRENGTH (MPa) | 25 | 31 | 31 | 29 | 35 | 35 | 39 |
| WEAR RESISTANCE (μm) | 120 | 85 | 88 | 87 | 40 | 40 | 38 |
| CLEANING PERFORMANCE VALUE | 1.46 | 1.16 | 1.20 | 1.05 | 0.49 | 0.49 | 0.45 |
| JUDGEMENT | X | X | X | X | ○ | ○ | ○ |

TABLE 2

| | | EXAMPLE 4 | EXAMPLE 5 | EXAMPLE 6 | EXAMPLE 7 | EXAMPLE 8 | COMPARISON EXAMPLE 5 |
|---|---|---|---|---|---|---|---|
| RUBBER | NBR | | | | | | |
| COMPONENT (1) | HNBR | 45 | 45 | 45 | 45 | 45 | 45 |
| | ZDMA-CONTAINING HNBR | 55 | 55 | 55 | 55 | 55 | 55 |
| FILLER (2) | METHACRYLIC ACID | | | | | | |
| | ZINC OXIDE | | | | | | |
| | AGE RESISTOR A | 1 | 1 | 1 | 1 | 1 | 1 |
| | AGE RESISTOR B | 2 | 2 | 2 | 2 | 2 | 2 |
| CROSSLINKING AGENT(3) | ORGANIC PEROXIDE | 3 | 3 | 3 | 3 | 3 | 3 |
| DISPERSION- | DISPERSION-IMPROVING AGENT A | 1.0 | 5.0 | | 13.0 | 5.0 | 16.0 |
| IMPROVING | DISPERSION-IMPROVING AGENT B | | | 5.0 | | 5.0 | |
| AGENT (4) | DISPERSION-IMPROVING AGENT C | | | | | | |
| MODULUS OF REPULSION ELASTICITY (%) | | 53 | 55 | 56 | 59 | 60 | 48 |
| TENSILE STRENGTH (MPa) | | 38 | 43 | 42 | 55 | 49 | 33 |
| WEAR RESISTANCE (μm) | | 36 | 33 | 34 | 33 | 28 | 66 |
| CLEANING PERFORMANCE VALUE | | 0.43 | 0.42 | 0.41 | 0.39 | 0.37 | 0.86 |
| JUDGEMENT | | ○ | ◎ | ○ | ○ | ○ | X |

TABLE 3

| | | COMPARISON EXAMPLE 6 | COMPARISON EXAMPLE 7 | EXAMPLE 9 | EXAMPLE 10 | EXAMPLE 11 | EXAMPLE 12 | EXAMPLE 13 |
|---|---|---|---|---|---|---|---|---|
| RUBBER | NBR | | | 100 | | | | |
| COMPONENT (1) | HNBR | 45 | 45 | | 100 | 45 | 45 | 45 |
| | ZDMA-CONTAINING HNBR | 55 | 55 | | | 55 | 55 | 55 |
| FILLER (2) | METHACRYLIC ACID | | | 10 | 10 | | | |
| | ZINC OXIDE | | | 10 | 10 | | | |
| | AGE RESISTOR A | 1 | 1 | 1 | 1 | 1 | 1 | 1 |
| | AGE RESISTOR B | 2 | 2 | 2 | 2 | 2 | 2 | 2 |
| CROSSLINKING AGENT (3) | ORGANIC PEROXIDE | 3 | 3 | 3 | 3 | 3 | 3 | 3 |
| DISPERSION- | DISPERSION-IMPROVING AGENT A | | | | | | | |
| IMPROVING | DISPERSION-IMPROVING AGENT B | | | | | | | |
| AGENT (4) | DISPERSION-IMPROVING AGENT C | | 0.01 | 0.05 | 0.05 | 0.05 | 0.5 | 1.5 |
| MODULUS OF REPULSION ELASTICITY (%) | | 46 | 47 | 50 | 51 | 53 | 56 | 58 |
| TENSILE STRENGTH (MPa) | | 32 | 30 | 35 | 38 | 41 | 44 | 46 |
| WEAR RESISTANCE (μm) | | 55 | 54 | 39 | 36 | 32 | 31 | 33 |
| CLEANING PERFORMANCE VALUE | | 1.01 | 0.85 | 0.49 | 0.48 | 0.47 | 0.43 | 0.47 |
| JUDGEMENT | | X | X | ○ | ○ | ○ | ○ | ◎ |

| | | EXAMPLE 14 | COMPARISON EXAMPLE 8 |
|---|---|---|---|
| RUBBER COMPONENT (1) | NBR | | |
| | HNBR | 45 | 45 |
| | ZDMA-CONTAINING HNBR | 55 | 55 |
| FILLER (2) | METHACRYLIC ACID | | |
| | ZINC OXIDE | | |
| | AGE RESISTOR A | 1 | 1 |
| | AGE RESISTOR B | 2 | 2 |
| CROSSLINKING AGENT (3) | ORGANIC PEROXIDE | 3 | 3 |
| DISPERSION-IMPROVING AGENT (4) | DISPERSION-IMPROVING AGENT A | | |
| | DISPERSION-IMPROVING AGENT B | | |
| | DISPERSION-IMPROVING AGENT C | 5.0 | 16.0 |

TABLE 3-continued

| | | |
|---|---|---|
| MODULUS OF REPULSION ELASTICITY (%) | 62 | 46 |
| TENSILE STRENGTH (MPa) | 52 | 33 |
| WEAR RESISTANCE (μm) | 28 | 92 |
| CLEANING PERFORMANCE VALUE | 0.41 | 0.99 |
| JUDGEMENT | ○ | X |

TABLE 4

| | | COMPARISON EXAMPLE 9 | COMPARISON EXAMPLE 10 | COMPARISON EXAMPLE 11 | COMPARISON EXAMPLE 12 | EXAMPLE 15 | EXAMPLE 16 | EXAMPLE 17 |
|---|---|---|---|---|---|---|---|---|
| RUBBER COMPONENT (1) | NBR | 100 | | | | 100 | | |
| | HNBR | | 100 | 93 | 93 | | 100 | 45 |
| | ZDMA-CONTAINING HNBR | | | 7 | 7 | | | 55 |
| FILLER (2) | METHACRYLIC ACID | 2 | 2 | | | 10 | 10 | |
| | ZINC OXIDE | 2 | 2 | | | 10 | 10 | |
| | AGE RESISTOR A | | | | | 1 | 1 | 1 |
| | AGE RESISTOR B | | | | | 2 | 2 | 2 |
| CROSSLINKING AGENT (3) | ORGANIC PEROXIDE | 3 | 3 | 3 | 3 | 3 | 3 | 3 |
| DISPERSION-IMPROVING AGENT (4) | DISPERSION-IMPROVING AGENT D | | | | 0.01 | 0.05 | 0.05 | 0.05 |
| MODULUS OF REPULSION ELASTICITY (%) | | 45 | 49 | 51 | 51 | 47 | 51 | 53 |
| TENSILE STRENGTH (MPa) | | 16 | 25 | 11 | 10 | 41 | 41 | 42 |
| WEAR RESISTANCE (μm) | | 99 | 76 | 46 | 47 | 31 | 28 | 27 |
| CLEANING PERFORMANCE VALUE | | 0.92 | 0.85 | 0.84 | 0.89 | 0.44 | 0.44 | 0.42 |
| JUDGEMENT | | X | X | X | X | ○ | ○ | ○ |

| | | EXAMPLE 18 | EXAMPLE 19 | EXAMPLE 20 | COMPARISON EXAMPLE 13 |
|---|---|---|---|---|---|
| RUBBER COMPONENT (1) | NBR | | | | |
| | HNBR | 45 | 45 | 45 | 45 |
| | ZDMA-CONTAINING HNBR | 55 | 55 | 55 | 55 |
| FILLER (2) | METHACRYLIC ACID | | | | |
| | ZINC OXIDE | | | | |
| | AGE RESISTOR A | 1 | 1 | 1 | 1 |
| | AGE RESISTOR B | 2 | 2 | 2 | 2 |
| CROSSLINKING AGENT (3) | ORGANIC PEROXIDE | 3 | 3 | 3 | 3 |
| DISPERSION-IMPROVING AGENT (4) | DISPERSION-IMPROVING AGENT D | 0.5 | 1.5 | 10.0 | 13.0 |
| MODULUS OF REPULSION ELASTICITY (%) | | 56 | 62 | 68 | 55 |
| TENSILE STRENGTH (MPa) | | 43 | 48 | 43 | 25 |
| WEAR RESISTANCE (μm) | | 25 | 21 | 35 | 86 |
| CLEANING PERFORMANCE VALUE | | 0.41 | 0.39 | 0.49 | 1.05 |
| JUDGEMENT | | ○ | ◎ | ○ | X |

The following products were used as the components shown in tables 1 and 2:

NBR: "N232S (commercial name)" produced by JSR Corporation (bound acrylonitrile amount: 35%)

HNBR: "Zetpol 2010H (commercial name)" produced by Zeon Corporation (bound acrylonitrile amount: 36%, Mooney viscosity: 145).

ZDMA-containing HNBR: "Zeoforte ZSC 2195H (commercial name)" produced by Zeon Corporation (100 parts by mass of zinc methacrylate (ZDMA) was finely dispersed in 100 parts by mass of HNBR "Zetpol 2010H" serving as base polymer Methacrylic acid: "MAA (commercial name)" produced by Mitsubishi Rayon Co., Ltd.

Zinc oxide: "Two kinds of zinc oxide" produced by Mitsui Mining and Smelting Co., Ltd.

Age resistor A: p,p'-dicumyldiphenylamine ("NOCRAC CD (commercial name)" produced by Ouchishinko Chemical Industrial Co., Ltd.)

Age resistor B: 2-mercaptobenzimidazole ("NOCRAC MB (commercial name)" produced by Ouchishinko Chemical Industrial Co., Ltd.)

Organic peroxide: dicumyl peroxide ("PERCUMYL D (commercial name)" produced by NOF CORPORATION)

Dispersion-improving agent A: Benzenethiol (produced by Sumitomo Seika Chemical Co., Ltd.

Dispersion-improving agent B: diphenyl disulfide (produced by Sumitomo Seika Chemical Co., Ltd.

Dispersion-improving agent C: bis(pentabromophenyl) disulfide

Dispersion-improving agent D: zinc salt of 4-fluorothiophenol

The properties shown in the table 1 through 4 were measured by the following methods.

(1) Modulus of Repulsion Elasticity

By using a prepared compressed ball, the modulus of repulsion elasticity thereof was measured at 23° C. in accordance with the Lupke type test of JIS K 6255.

(2) Tensile Strength

Dumbbell specimens No. 3 were punched out of a sheet having a thickness of 2 mm. The tensile strength of each specimen was measured at a pulling rate of 500 mm/minute in accordance with JIS K 6251.

(3) Evaluation of Wear Resistance

The cleaning member of each of the examples and the comparison examples was mounted on an image-forming apparatus which was a commercially available printer in which a photoreceptor rotates and which is capable of forming an image. Printing was performed on 150,000 sheets of paper by setting the rotational speed of the photoreceptor to 200 mm to 500 mm/second and a printing concentration to 4%. Thereafter the edge of each cleaning blade was observed.

Figure 1:
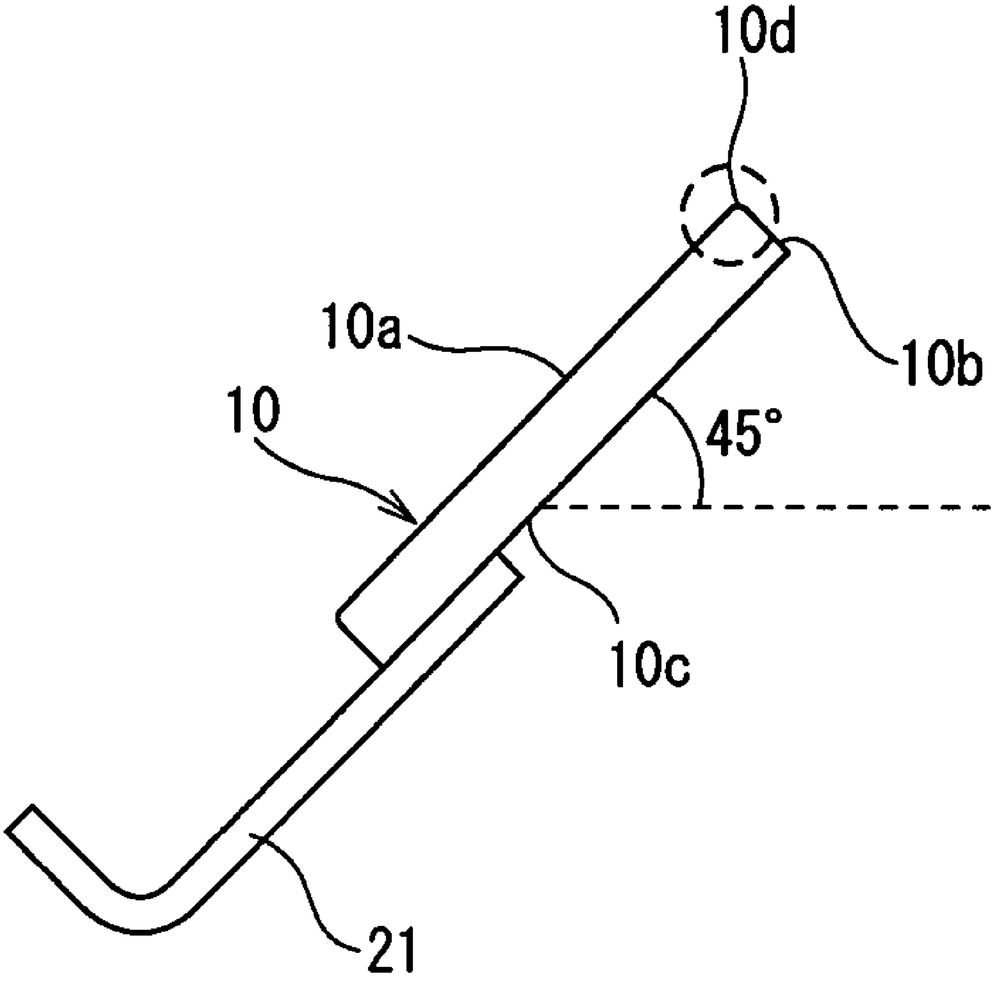
FIG. 1 is a sectional illustration showing a cleaning member having a cleaning blade of the present invention for use in an image-forming apparatus.
Figure 2A:
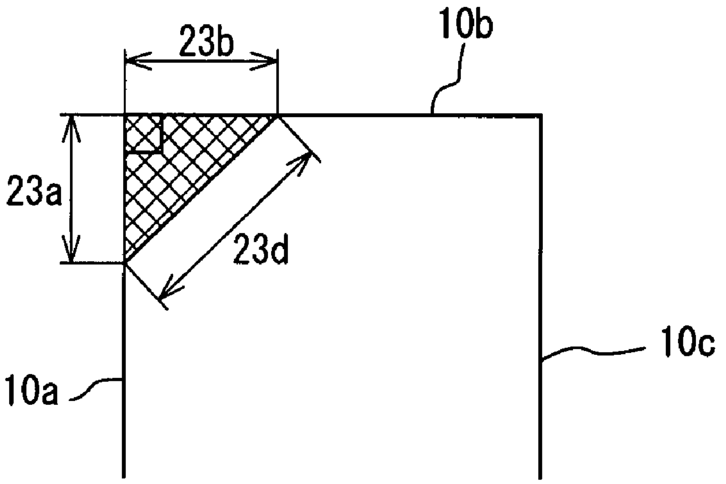
FIG. 2A is an enlarged view showing an edge of the cleaning blade of the present invention for use in an image-forming apparatus after a paper supply test for image formation is conducted by mounting the cleaning blade on the image-forming apparatus.
Figure 2B:
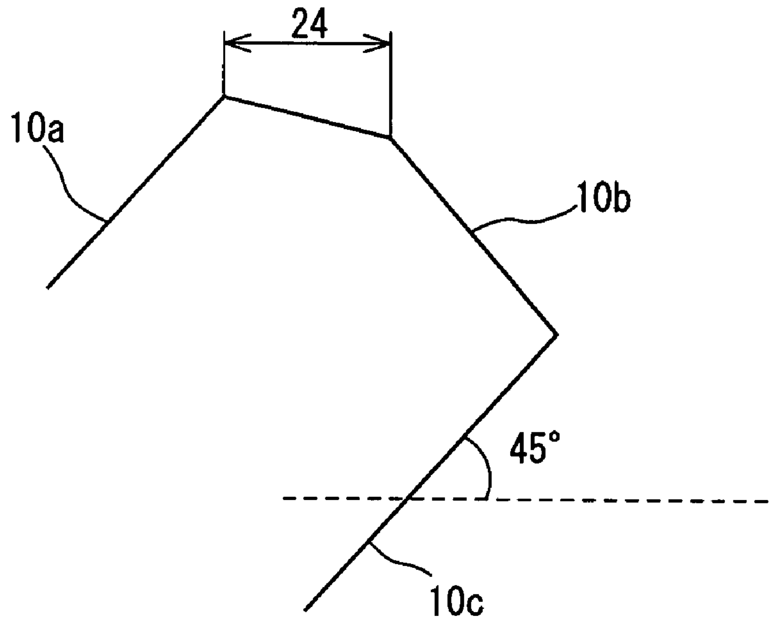
FIG. 2B shows a portion whose wear indication value is measured.

As shown in FIG. 2, a sectional length Ws (23*d* in FIG. 2A) which is the length of an inclined surface of the cleaning blade obtained by connecting a worn end of a wear depth Wm (23*a* in FIG. 2A) and a worn end of a wear width Wc (23*b* in FIG. 2A) to each other with a straight line was measured as a horizontal distance (24 in FIG. 2B) of the sectional length Ws of the worn surface when the cleaning blade was inclined at 45 degrees. The wear resistance of each cleaning blade was evaluated based on the degree of an obtained wear indication value thereof.

The test was conducted at a normal temperature of 23° C. and a relative humidity of 55%.

(4) Evaluation of Cleaning Performance

The cleaning members of each of the examples and the comparison examples was mounted on an image-forming apparatus (produced by the present applicant) in which a photoreceptor rotates and which is capable of developing toner. The toner had an average particle volume diameter of 5 to 10 μm, was pulverized, and had a spherical degree of 0.90 to 0.99.

Print was performed on 150,000 sheets of paper by setting the rotational speed of the photoreceptor to 200 mm to 500 mm/second and the printing concentration to 4%. Thereafter the amount of the toner (toner amount Ta present on surface of photoreceptor before cleaning blade slidingly contacts surface of photoreceptor) supplied to the photoreceptor per unit area was computed beforehand. The photoreceptor was rotated to remove the toner by the cleaning blade. Thereafter the amount of the toner (toner amount Tb which remains on surface of photoreceptor after cleaning blade slidingly contacts surface thereof) present on the surface of the photoreceptor disposed rearward from the cleaning blade was converted into an amount per unit area. In this manner, the toner amount Tb which remains on the surface of the photoreceptor after the cleaning blade slidingly contacts surface thereof was obtained. From the obtained values, the value indicating the cleaning performance was computed based on the following equation:

The cleaning performance value=(toner amount Tb which remains on surface of photoreceptor after cleaning blade slidingly contacts surface thereof)/(toner amount Ta present on surface of photoreceptor before cleaning blade slidingly contacts surface of photoreceptor).

The test was conducted at a normal temperature of 23° C. and a relative humidity of 55%.

The cleaning blades of the comparison examples 1, 2, 6, 9, 10, and 11 which did not contain the dispersion-improving agent and those of the comparison examples 3, 4, 7, and 12 which contained a small amount of the dispersion-improving agent were inferior in both the wear resistance and the cleaning performance thereof. More specifically, in the evaluation of the wear resistances thereof, the depth of wear thereof were at least 1.4 times larger, in average about two times larger or three times larger than the depth of wear of the cleaning blades of the examples having the same composition as those of the cleaning blades of the above-described comparison examples except the dispersion-improving agent. In the evaluation of the cleaning performance of the cleaning blades of the above-described comparison examples, all of the cleaning blades were not less than 0.8. This indicates that they did not display a sufficient cleaning performance.

The cleaning performances of the cleaning blades of the comparison examples 5 and 8 which contained a large amount of the dispersion-improving agent were improved over those of the cleaning blades of the comparison examples 1 through 4 and 6 and 7, but could not be put into practical use and were inferior in the wear resistance thereof. The cleaning blade of the comparison example 13 which contained 13 parts by weight of the dispersion-improving agent D for 100 parts by weight of the rubber component exceeded 1.0 in its cleaning performance and was inferior in its wear resistance.

On the other hand, the cleaning blades of the examples 1 through 20 had the wear indication values of not more than 40 μm and the cleaning performance of less than 0.5. This indicates that the cleaning blades can be put into practical use and were excellent in the wear resistance and the cleaning performance thereof.

What is claimed is:

1. A cleaning blade for use in an image-forming apparatus formed by molding a thermosetting elastomer composition containing a rubber component (1), a filler (2), a crosslinking agent (3), and a dispersion-improving agent (4), wherein as said dispersion-improving agent (4), a compound shown by a formula (1) shown below or/and a compound shown by a formula (2) shown below are contained in said thermosetting elastomer composition at 0.05 to 15 parts by mass for 100 parts by mass of said rubber component (1):

Chemical formula 1

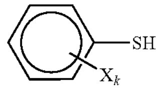

(1)

wherein X denotes substituting groups except fluoro group, and k denotes integers 0 through 5

Chemical formula 2

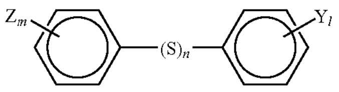

(2)

wherein Y and Z denote substituting groups; 1 and m denote integers 0 through 5; and n denotes natural numbers.

2. The cleaning blade according to claim 1, wherein at least one of said substituting groups Y and Z of said compound shown by said chemical formula (2) is a bromo group.

3. The cleaning blade according to claim 1, wherein said thermosetting elastomer composition contains 0.1 to 80 parts by mass of said filler (2) and 0.1 to 30 parts by mass of said crosslinking agent (3) for 100 parts by mass of said rubber component (1).

4. The cleaning blade according to claim 1, wherein said thermosetting elastomer composition contains one or more kinds of said filler (2) selected from the group consisting of a co-crosslinking agent, a vulcanization accelerator, a vulcanization-accelerating assistant agent, an age resistor, a softener for rubber, a reinforcing agent, and other kinds of additives.

5. The cleaning blade according to claim 1, wherein said thermosetting elastomer composition contains 5 to 60 parts by mass of a metal salt of α,β-unsaturated carboxylic acid as said filler (2) or 5 to 60 parts by mass of a mixture of α,β-unsaturated carboxylic acid and a metal oxide as said filler (2) for 100 parts by mass of said rubber component (1).

6. The cleaning blade according to claim 1, wherein as said rubber component (1), said thermosetting elastomer composition contains one or more kinds of rubber selected from the group consisting of acrylonitrile butadiene rubber, acrylonitrile-butadiene rubber into which a carboxyl group is introduced, hydrogenated acrylonitrile-butadiene rubber, hydrogenated acrylonitrile-butadiene rubber into which a carboxyl group is introduced, natural rubber, butadiene rubber, styrene-butadiene rubber, isoprene rubber, butyl rubber, chloroprene rubber, acrylic rubber, epichlorohydrin rubber, ethylene-propylene rubber, and ethylene-propylene-diene copolymer rubber.

7. The cleaning blade according to claim 1, wherein for 100 parts by mass which is the entire mass of said rubber component (1), said thermosetting elastomer composition contains as said rubber component (1) 10 to 75 parts by mass of hydrogenated acrylonitrile-butadiene rubber in which a metal salt of α,β-unsaturated carboxylic acid is dispersed.

8. The cleaning blade according to claim 7, wherein said thermosetting elastomer composition further contains acrylonitrile-butadiene rubber as said rubber component (1).

9. The cleaning blade according to claim 1, wherein as said crosslinking agent (3), said thermosetting elastomer composition contains one or not less than two kinds of substances selected from the group consisting of sulfur, an organic sulfur-containing compound, an organic peroxide, a heat-resistant crosslinking agent, and a resin crosslinking agent.

10. The cleaning blade according to claim 1, wherein a modulus of repulsion elasticity of said thermosetting elastomer composition is set to 50 to 70%.

11. A cleaning blade for use in an image-forming apparatus formed by molding a thermosetting elastomer composition containing a rubber component (1), a filler (2), a crosslinking agent (3), and a dispersion-improving agent (4), wherein as said dispersion-improving agent (4), a compound shown by a formula (3) shown below or/and a metal salt of said compound is contained in said thermosetting elastomer composition at 0.05 to 10 parts by mass for 100 parts by mass of said rubber component (1):

Chemical formula 3

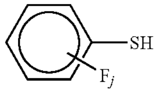

(3)

wherein F denotes fluoro group; and j denotes integers 1 through 5.

12. The cleaning blade according to claim 11, wherein said thermosetting elastomer composition contains 0.1 to 80 parts by mass of said filler (2) and 0.1 to 30 parts by mass of said crosslinking agent (3) for 100 parts by mass of said rubber component (1).

13. The cleaning blade according to claim 11, wherein said thermosetting elastomer composition contains one or more kinds of said filler (2) selected from the group consisting of a co-crosslinking agent, a vulcanization accelerator, a vulcanization-accelerating assistant agent, an age resistor, a softener for rubber, a reinforcing agent, and other kinds of additives.

14. The cleaning blade according to claim 11, wherein said thermosetting elastomer composition contains 5 to 60 parts by mass of a metal salt of α,β-unsaturated carboxylic acid as said filler (2) or 5 to 60 parts by mass of a mixture of α,β-unsaturated carboxylic acid and a metal oxide as said filler (2) for 100 parts by mass of said rubber component (1).

15. The cleaning blade according to claim 11, wherein as said rubber component (1), said thermosetting elastomer composition contains one or more kinds of rubber selected from the group consisting of acrylonitrile butadiene rubber, acrylonitrile-butadiene rubber into which a carboxyl group is introduced, hydrogenated acrylonitrile-butadiene rubber, hydrogenated acrylonitrile-butadiene rubber into which a carboxyl group is introduced, natural rubber, butadiene rubber, styrene-butadiene rubber, isoprene rubber, butyl rubber, chloroprene rubber, acrylic rubber, epichlorohydrin rubber, ethylene-propylene rubber, and ethylene-propylene-diene copolymer rubber.

16. The cleaning blade according to claim 11, wherein for 100 parts by mass which is an entire mass of said rubber component (1), said thermosetting elastomer composition contains as said rubber component (1) 10 to 75 parts by mass of hydrogenated acrylonitrile-butadiene rubber in which a metal salt of α,β-unsaturated carboxylic acid is dispersed.

17. The cleaning blade according to claim 16, wherein said thermosetting elastomer composition further contains acrylonitrile-butadiene rubber or/and hydrogenated acrylonitrile-butadiene rubber as said rubber component (1).

18. The cleaning blade according to claim 11, wherein as said crosslinking agent (3), said thermosetting elastomer composition contains one or not less than two kinds of substances selected from the group consisting of sulfur, an organic sulfur-containing compound, an organic peroxide, a heat-resistant crosslinking agent, and a resin crosslinking agent.

19. The cleaning blade according to claim 11, wherein a modulus of repulsion elasticity of said thermosetting elastomer composition is set to 50 to 70%.

* * * * *